(12) United States Patent
Lee

(10) Patent No.: US 9,344,471 B2
(45) Date of Patent: May 17, 2016

(54) METHOD AND APPARATUS FOR MANAGING AND PROCESSING INFORMATION OF AN OBJECT FOR MULTI-SOURCE-STREAMING

(75) Inventor: Jae Wook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1256 days.

(21) Appl. No.: 12/811,644

(22) PCT Filed: Oct. 10, 2008

(86) PCT No.: PCT/KR2008/005968
§ 371 (c)(1),
(2), (4) Date: Jul. 2, 2010

(87) PCT Pub. No.: WO2009/091111
PCT Pub. Date: Jul. 23, 2009

(65) Prior Publication Data
US 2010/0287463 A1    Nov. 11, 2010

Related U.S. Application Data

(60) Provisional application No. 61/021,042, filed on Jan. 15, 2008, provisional application No. 61/024,542, filed on Jan. 29, 2008, provisional application No. 61/033,434, filed on Mar. 4, 2008.

(30) Foreign Application Priority Data

Mar. 19, 2008 (KR) .................. 10-2008-0025601

(51) Int. Cl.
*G06F 17/00* (2006.01)
*H04L 29/06* (2006.01)
(Continued)

(52) U.S. Cl.
CPC ........ *H04L 65/4084* (2013.01); *H04N 21/2353* (2013.01); *H04N 21/2358* (2013.01);
(Continued)

(58) Field of Classification Search
CPC ............ H04L 12/2805; H04L 12/2812; H04L 2012/2849; H04L 29/06027; H04L 67/02; H04L 12/2803; H04L 12/2809; H04N 21/43615; H04N 21/4622; H04N 21/84; H04N 21/8543; G06F 17/30017; G06F 17/2247
USPC ........ 715/200–205, 209, 234–236, 243–253, 715/255, 276–277, 700, 704, 714–722, 715/730–732, 760
See application file for complete search history.

(56) References Cited

U.S. PATENT DOCUMENTS 6,510,553 B1 *  1/2003  Hazra ............................. 725/87
6,816,909 B1 * 11/2004  Chang et al. .................. 709/231
(Continued)

FOREIGN PATENT DOCUMENTS

KR    10-2006-0068535 A    6/2006
WO    WO 2008/039005 A1    4/2008

OTHER PUBLICATIONS

M. Morrison et al.,"XML Unleashed, Chapters 9 and 11," © 2000 Sams Publishing, pp. 101-115 (ch. 9), pp. 120-137 (ch. 11).*
(Continued)

*Primary Examiner* — Cesar Paula
*Assistant Examiner* — James H Blackwell
(74) *Attorney, Agent, or Firm* — Birch, Stewart, Kolasch & Birch, LLP

(57) ABSTRACT

Preparing of information about a content source is disclosed. One method in accordance with the information preparing creates item information on a first component pertaining to an arbitrary content source, incorporates the created information on the first component into a first structure element (e.g., tag), creates a second structure element containing information making display layout information for the arbitrary content source accessible, creates information on at least one component pertaining to the arbitrary content source other than the first component, and incorporates the created information on the at least one component into at least one third structure element included within the second structure element.

6 Claims, 13 Drawing Sheets

(51) Int. Cl.
  *H04N 21/235* (2011.01)
  *H04N 21/2365* (2011.01)
  *H04N 21/436* (2011.01)
  *H04N 21/462* (2011.01)
  *H04N 21/8543* (2011.01)
  *H04N 21/858* (2011.01)

(52) U.S. Cl.
  CPC ..... *H04N21/2365* (2013.01); *H04N 21/43615* (2013.01); *H04N 21/4622* (2013.01); *H04N 21/8543* (2013.01); *H04N 21/8586* (2013.01)

(56) References Cited

U.S. PATENT DOCUMENTS

| | | | | |
|---|---|---|---|---|
| 7,447,793 | B2* | 11/2008 | Morioka | 709/231 |
| 7,607,582 | B2* | 10/2009 | Vallabh et al. | 235/472.01 |
| 7,899,915 | B2* | 3/2011 | Reisman | 709/228 |
| 8,065,335 | B2* | 11/2011 | Min et al. | 707/793 |
| 8,271,625 | B2* | 9/2012 | Kwon et al. | 709/221 |
| 8,316,140 | B2* | 11/2012 | Huettner | 709/229 |
| 8,738,806 | B2* | 5/2014 | Kwon et al. | 709/248 |
| 2002/0059344 | A1* | 5/2002 | Britton et al. | 707/513 |
| 2002/0069419 | A1* | 6/2002 | Raverdy et al. | 725/87 |
| 2003/0192062 | A1* | 10/2003 | Kou | 725/141 |
| 2004/0088731 | A1* | 5/2004 | Putterman et al. | 725/94 |
| 2004/0100942 | A1 | 5/2004 | Blank et al. | |
| 2004/0220791 | A1* | 11/2004 | Lamkin et al. | 703/11 |
| 2004/0243645 | A1 | 12/2004 | Broder et al. | |
| 2005/0021866 | A1* | 1/2005 | Kang et al. | 709/248 |
| 2005/0210414 | A1* | 9/2005 | Angiulo et al. | 715/838 |
| 2006/0117259 | A1* | 6/2006 | Nam et al. | 715/719 |
| 2006/0242259 | A1* | 10/2006 | Vallabh et al. | 709/217 |
| 2007/0089143 | A1 | 4/2007 | LeFevre et al. | |
| 2007/0143370 | A1* | 6/2007 | Bushmitch et al. | 707/204 |
| 2007/0175975 | A1* | 8/2007 | Kim et al. | 235/375 |
| 2007/0239864 | A1* | 10/2007 | Kwon et al. | 709/223 |
| 2007/0260752 | A1* | 11/2007 | Han et al. | 709/248 |
| 2008/0129864 | A1* | 6/2008 | Stone et al. | 348/468 |
| 2008/0301743 | A1* | 12/2008 | Vrielink et al. | 725/110 |
| 2009/0024922 | A1* | 1/2009 | Markowitz et al. | 715/716 |
| 2009/0193474 | A1* | 7/2009 | Stein | 725/82 |

OTHER PUBLICATIONS

Contributing Members of the UPnP Forum,"UPnP AV Architecture:0.83, for UPnP Version 1,0, Preliminary Design (TPD)," © Jun. 6, 2002, 22 pages.*

Contributing Members of the UPnP Forum,UPnP AV Architecture: 0.83, for UPnP Version 1.0, Preliminary Design, Jun. 12, 2002, 22 pages.*

* cited by examiner

MSRB (Multi-streaming Resource Bundle)

MSRB (Multi-streaming Resource Bundle)

Fig. 12

*Actions for Display Layout and Rendering*

| Name | Input | Output |
|---|---|---|
| SetRenderingPosition() | RCSID, Position | None |
| GetRenderingPosition() | RCSID | Position |
| SetRenderingSize() | RCSID, Size | None |
| GetRenderingSize() | RCSID | Size |
| SetRenderingAspect() | RCSID, Aspect | None |
| GetRenderingAspect() | RCSID | Aspect |
| SetRenderingBlend() | RCSID, Blend | None |
| GetRenderingBlend() | RCSID | Blend |
| SetRenderingShow() | RCSID, Show | None |
| GetRenderingShow() | RCSID | Show |
| SetRenderingInfo() | RCSID, RenderingInfo | None |
| GetRenderingInfo() | RCSID | RenderingInfo |
| GetDisplayInfo() | RCSID or GroupRCSID | DisplayInfo |
| ⋮ | ⋮ | ⋮ |

*State Variables for Display Layout and Rendering*

| Name | R/O | Data Type | Allowed Value |
|---|---|---|---|
| DisplayInfo | R | string | CSV(ui4) |
| RenderingInfo | R | string | CSV(ui4) |
| Position | R | string | CSV(ui4) |
| Size | R | string | CSV(ui4) |
| Aspect | R | string | CSV(ui4) |
| A_ARG_TYPE_Blend | R | i4 | |
| A_ARG_TYPE_Show | R | boolean | |
| ⋮ | ⋮ | ⋮ | ⋮ |

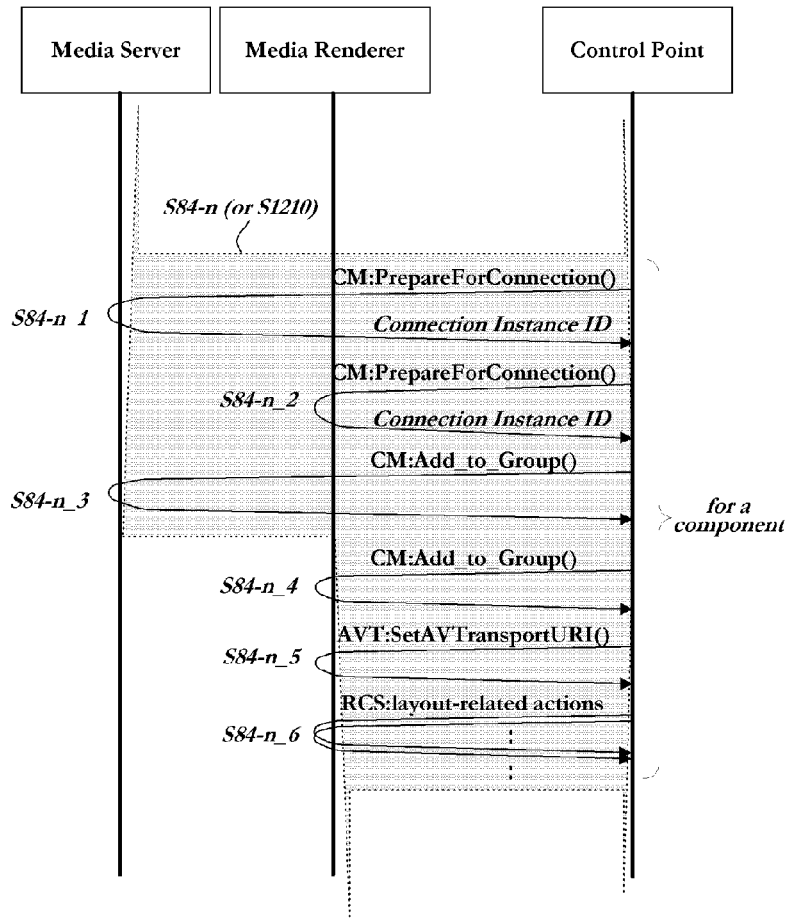

Fig. 17
*State Variables for Group Connections*
| Name | R/O | Data Type | Allowed Value |
|---|---|---|---|
| GroupConnectionIDs | R | string | CSV(ui4) |
| A_ARG_TYPE_GroupConnectionID | R | i4 | |
| A_ARG_TYPE_GroupAVTransportID | R | i4 | |
| A_ARG_TYPE_GroupRCSID | R | i4 | |
Fig. 18
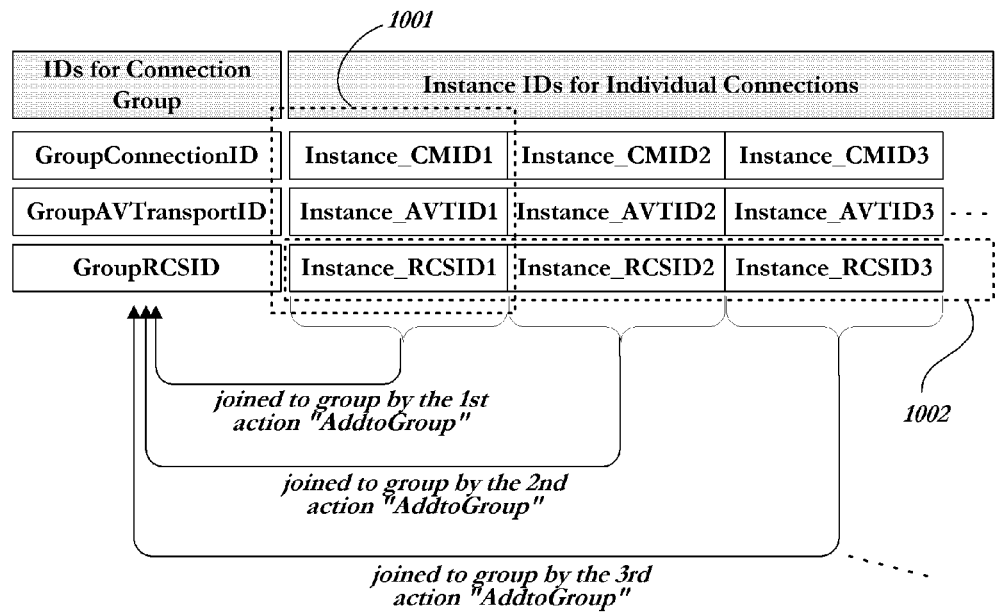
Fig. 19
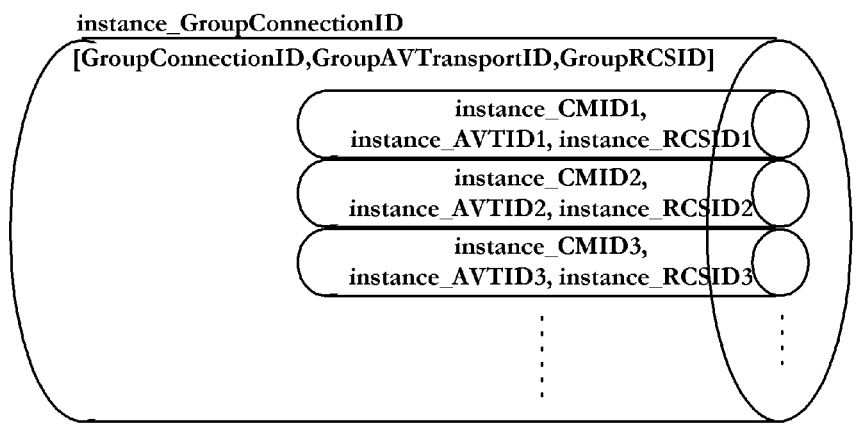

METHOD AND APPARATUS FOR MANAGING AND PROCESSING INFORMATION OF AN OBJECT FOR MULTI-SOURCE-STREAMING

CROSS REFERENCE TO RELATED APPLICATIONS

This application is the National Phase of PCT/KR2008/005968 filed on Oct. 10, 2008, which claims priority under 35 U.S.C. 119(e) to U.S. Provisional Application No. 61/021,042 filed on Jan. 15, 2008, U.S. Provisional Application No. 61/024,542 filed on Jan. 29, 2008, U.S. Provisional Application No. 61/033,434 filed on Mar. 4, 2008, and under 35 U.S.C. 119(a) to Patent Application No. 10-2008-0025601 filed in Republic of Korea, on Mar. 19, 2008. The entire contents of all of the above applications is hereby incorporated by reference.

TECHNICAL FIELD

The present invention is related to a method and an apparatus for managing information about content stored in a device on a UPnP network and processing information between networked devices according to the information.

BACKGROUND ART

A UPnP™ (hereinafter, it is called "UPnP" for short) network proposed for home networking consists of a plurality of UPnP devices, services, and control points (CPs). A service on a UPnP network represents a smallest control unit on the network, which is modeled by state variables.

A CP (Control Point) on a UPnP network represents a control application equipped with functions for detecting and controlling other devices and/or services. A CP is operated on a physical device such as a PDA providing the user with a convenient interface.

As shown in FIG. 1, a UPnP AV home network comprises a media server (MS) 120 providing a home network with media data, a media renderer (MR) 130 playing media data through the home network, and an AV control point 110 controlling the media server 120 and the media renderer 130. The media server 120 and the media renderer 130 are controlled devices controlled by the control point 110.

The media server 120 (to be precise, CDS (Content Directory Service) 121 within the media server 120) stores media files and information of containers (which correspond to directories) as the corresponding object information. An 'object' is a comprehensive terminology indicating both an item having information about more than one media file and a container having information about a directory. Depending on circumstances, the terminology of 'object' can be used to specify either an item or a container. One item corresponds to one or more than one media file. For example, multiple media files of the same content but with different bit rates are managed as a single item.

FIG. 2 illustrates a simplified signal flow between devices and/or services during a media play procedure carried out in the network of FIG. 1.

First, the control point (CP) 110 obtains information about a protocol supported by the media renderer (MR) 130 (S01). The media server (MS) 120, to inform the control point 110 of information about a directory and media files under the corresponding directory, informs the control point 110 of information about a current directory and item information about media files under the directory each time a UPnP action 141 (e.g., a browsing action) is invoked (S10) in accordance with the user's request.

The CP 110 displays the received information about each individual object for the user through an appropriate UI (User Interface) (S11-1) after removing information about an item that does not follow the protocol supported by the media renderer 130. If the user selects an item (or a media file of particular quality belonging to the item) through a UI (S11-2), the CP 110 requests an action for preparing connection (PrepareForConnection( )) on the media server 120 and the media renderer 130 respectively for presentation of the selected media file (hereinafter, it is called 'component' or 'media component'). The CP 110 then receives an instance ID about participating elements (CM: ConnectionManager, AVT: AVTransport service, and RCS: RenderingControl service) required for presentation by streaming between both devices 120, 130 (S12-1, S12-2). The instance ID is used for specifying and controlling a current streaming service. (For example, if sound volume is to be adjusted during rendering of a presentation stream, a SetVolume( ) action uses an instance ID of a previously received RCS (S15-1).) Next, the CP 110 links access location information about a previously selected component (e.g., URL (Universal Resource Locator) information) with an AVTransport service 133 through an action (S13) (in the example of FIG. 1, AVTransport service is installed in the media renderer 130 but it can also be installed in the media server 120). The CP 110 requests a play action on AVTransport service 133, the play action having AVTransport service instance ID as an input argument (S14), whereby data of a component selected through an appropriate information exchange procedure between the media renderer 130 and the media server 120 are streamed and presented by RCS 131 (S15).

If another media file is to be presented during the presentation (S15), the procedure described above steps (S11-2, S12-1, S12-2, S13, and S14) should be carried out again after the presentation has begun. Depending on circumstances, the steps S10 and S11-1 can also be carried out.

The above method for playing more than one component in a sequential order is not suitable for the case when more than one media component is played in synchronization with each other (hereinafter, media components associated with each other are called 'multiple component'). One example is a case that a media component is a movie of video attribute and the other component is a subtitle, of text or image attribute, of the movie. In such a case of sequential playback, synchronized presentation of a media renderer becomes difficult or impossible because of time delay. For a certain case, playback of a component of video attribute may cause playback of an additional component of video attribute (which is, for example, a component of video attribute containing data for video scenes seen at a different angle). In this case, too, playback of respective content sources must be done without time delay among the content sources to satisfy a user during the playback.

DISCLOSURE

Technical Solution

One objective of the present invention is to provide a method and an apparatus for organizing information about items and processing signals between devices and/or services according to the organized information to present multiple media sources together. Another objective of the present invention is to provide a method and an apparatus for enabling display setting for multiple presentation of components of video attribute belonging to a content source.

A method for preparing information about a content source in accordance with one aspect of the present invention comprises: creating information on a first component pertaining to the content source and incorporating the created information on the first component into a first structure element; creating a second structure element containing information making display layout information for the content source accessible; and creating information on at least one component pertaining to the content source other than the first component and incorporating the created information on the at least one component into at least one third structure element included within the second structure element.

In an embodiment according to the present invention, the information making the display layout information accessible is written as a value of an attribute parameter of the second structure element.

In an embodiment according to the present invention, the information making the display layout information accessible is a URL (Uniform Resource Locator).

In an embodiment according to the present invention, the incorporating the created information on the first component into the first structure element further comprises: creating information indicating that the second structure element is included in the information on the content source; and incorporating the created indicating information into the first structure element.

In an embodiment according to the present invention, the at least one third structure element is included in the second structure element such that each of the at least one third structure element contains information on same type of components, and the incorporating the created information on the at least one component into the at least one third structure element further comprises writing a type of a component included in each of the at least one third structure element as a value of an attribute parameter of the each third structure element. In addition, the type is among at least TTO (Timed-Text Overlay), audio and video. In an embodiment according to the present invention, the incorporating the created information on the at least one component into the at least one third structure element further comprises writing, as a value of an attribute parameter of the third structure element, information indicating whether or not at least one component among components included in the third structure element must be selected when the first component is played.

In an embodiment according to the present invention, wherein the third structure element includes at least one fourth structure element that contains information indicative of access location information on a single component.

In another embodiment according to the present invention, the third structure element includes a fourth structure element that includes at least one fifth structure element specifying access location information on a single component, and the fifth structure element has same name and same structural function as the first structure element. For instance, the fifth structure element is a tag <res>.

In an embodiment according to the present invention, the at least one component other than the first component includes a component whose type is identical to that of the first component. The component whose type is identical to that of the first component contains same contents as the first component but is different in view-angle from the first component or encoded in different coding manner from the first component. Otherwise, the component whose type is identical to that of the first component contains contents that have no relation with contents of the first component.

In an embodiment according to the present invention, the component whose type is identical to that of the first component includes a component that can be played in synchronization with the first component.

A method for conducting presentation of a content through data transfer over a network in accordance with one aspect of the present invention, comprises: carrying out play preparing operations of a plurality of components pertaining to a content source and invoking at least one action related to rendering based on display layout information prepared for the content source, if selected item information is for multi-source streaming; and requesting play of the plurality of components after the play preparing operations are completed for all of the plurality of components.

Another method for conducting presentation of a content through data transfer over a network in accordance with one aspect of the present invention, comprises: carrying out play preparing operations of a plurality of components pertaining to a content source and invoking an action for setting access location information about display layout information prepared for the content source to a device for rendering, if selected item information is for multi-source streaming; and requesting play of the plurality of components after the play preparing operations are completed for all of the plurality of components.

In an embodiment according to the present invention, the carrying out play preparing operations and the invoking the at least one action related to rendering comprises obtaining the display layout information with reference to access location information specified as a value of an attribute parameter of a particular structure element within the item information.

In an embodiment according to the present invention, the carrying out play preparing operations and the invoking the action for setting the access location information to the device for rendering comprises: invoking an action for setting, to the device for rendering, the access location information specified as a value of an attribute parameter of a particular structure element within the item information.

In an embodiment according to the present invention, whether the selected item information is for multi-source streaming is known from a value of a particular attribute parameter of a particular structure element within the item information.

In an embodiment according to the present invention, the play preparing operations comprise, for each of the plurality of components: invoking a connection preparing action to obtain connection information from each of services to be involved in play operation; and invoking another action to set information necessary for component access to a play managing service.

In another embodiment according to the present invention, the play-preparing operations comprise: invoking an action to obtain group connection information from each of services to be involved in play operation; and for each of the plurality of components, invoking a connection preparing action to obtain connection information from each of the services, invoking another action to enlist the obtained connection information in the obtained group connection information, and invoking another action to set information necessary for component access to a play managing service.

In an embodiment according to the present invention, the device for rendering obtains the display layout information with reference to the set access location information and configures a window for rendering and/or video rendering conditions based on the obtained display layout information.

An apparatus, connected to a network, for providing information about a content through the network in accordance with one aspect of the present invention, comprises: a storage configured to store a plurality of content sources and information about the content sources; and a service configured to provide information about the content sources in response to an external request, the information about the content sources including at least one of item information about a content source including two or more media sources, the item information including a first structure element and a second structure element, the first structure element including a first component pertaining to the content source, the second structure element containing information making display layout information for the content source accessible, the second structure element including at least one third structure element containing information on at least one component pertaining to the content source other than the first component.

An apparatus for controlling presentation of a content through data transfer over a network in accordance with one aspect of the present invention, comprises: a control application configured to obtain information on content sources from a first device, and to request a second device to present an arbitrary content source stored in the first device based on the obtained information, wherein if item information, selected based on the obtained information on the content sources, relevant to a content source is for multi-source streaming, the control application is further configured: to conduct play preparing operations for a plurality of components pertaining to the content source for the first device and/or the second device; to invoke at least one action related to rendering to the second device based on display layout information prepared for the content source; and to request play of the plurality of components after the play preparing operations are completed for all of the plurality of components.

Another apparatus for controlling presentation of a content through data transfer over a network in accordance with one aspect of the present invention, comprises: a control application configured to obtain information on content sources from a first device, and to request a second device to present an arbitrary content source stored in the first device based on the obtained information, wherein if item information, selected based on the obtained information on the content sources, relevant to a content source is for multi-source streaming, the control application is further configured: to conduct play preparing operations for a plurality of components pertaining to the content source for the first device and/or the second device; to invoke an action for setting access location information about display layout information prepared for the content source to the second device; and to request play of the plurality of components after the play preparing operations are completed for all of the plurality of components.

ADVANTAGEOUS EFFECTS

At least one embodiment of the present invention as described above and described below in detail with reference to drawings improves the convenience of a user as synchronized playback of relevant media sources can be requested by selecting a single item and increases degree of satisfaction of a user while the user's listening or watching content by making a playback operation carried out simultaneously without time delay between components pertaining to a content source or different content sources.

DESCRIPTION OF DRAWINGS

FIG. 12 illustrates structures of actions to be used in relation with video rendering conditions and display-layout for content playback according to one embodiment of the present invention;

FIG. 13 illustrates rendering-related state variables defined in association with the actions shown in FIG. 12;

FIGS. 14 and 15 respectively illustrate a signal flow between devices and/or services for streaming of multiple sources based on group connection information according to another embodiment of the present invention;

FIG. 16 illustrates a structure of actions defined in association with group connection information according to one embodiment of the present invention;

FIG. 17 illustrates a state variable defined for group connection according to one embodiment of the present invention;

FIG. 18 illustrates management information, constructed by a connection manager service installed inside a device, for associating information of individual connections with group connection information according to one embodiment of the present invention;

FIG. 19 illustrates a conceptual scheme where instance IDs are structured for group and individual connection according to management information constructed in FIG. 18;

MODE FOR INVENTION

Hereinafter, embodiments of the present invention will be described in detail with reference to appended drawings.

Figure 1:
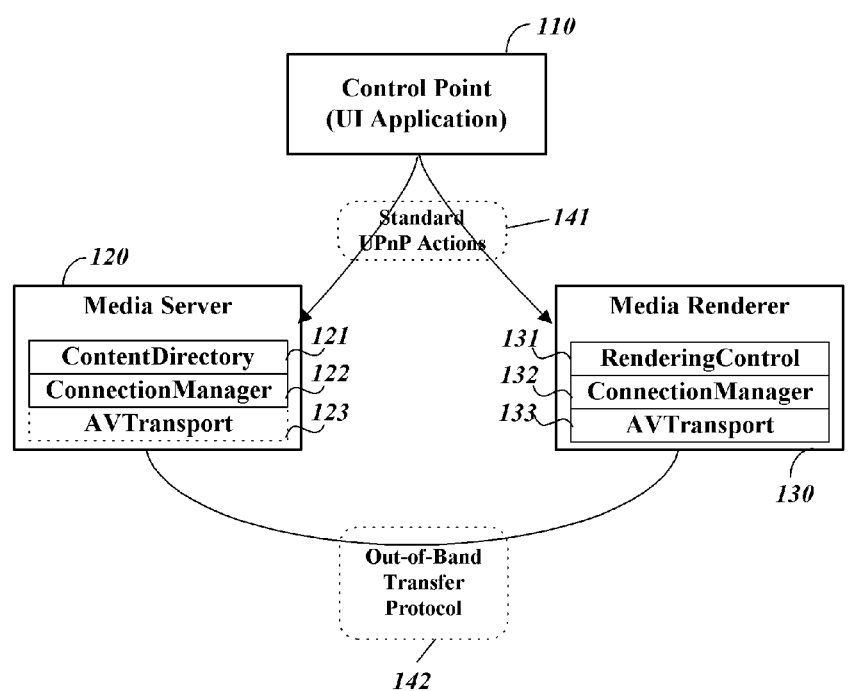
FIG. 1 illustrates a structure of a conventional UPnP AV network.
Figure 2:
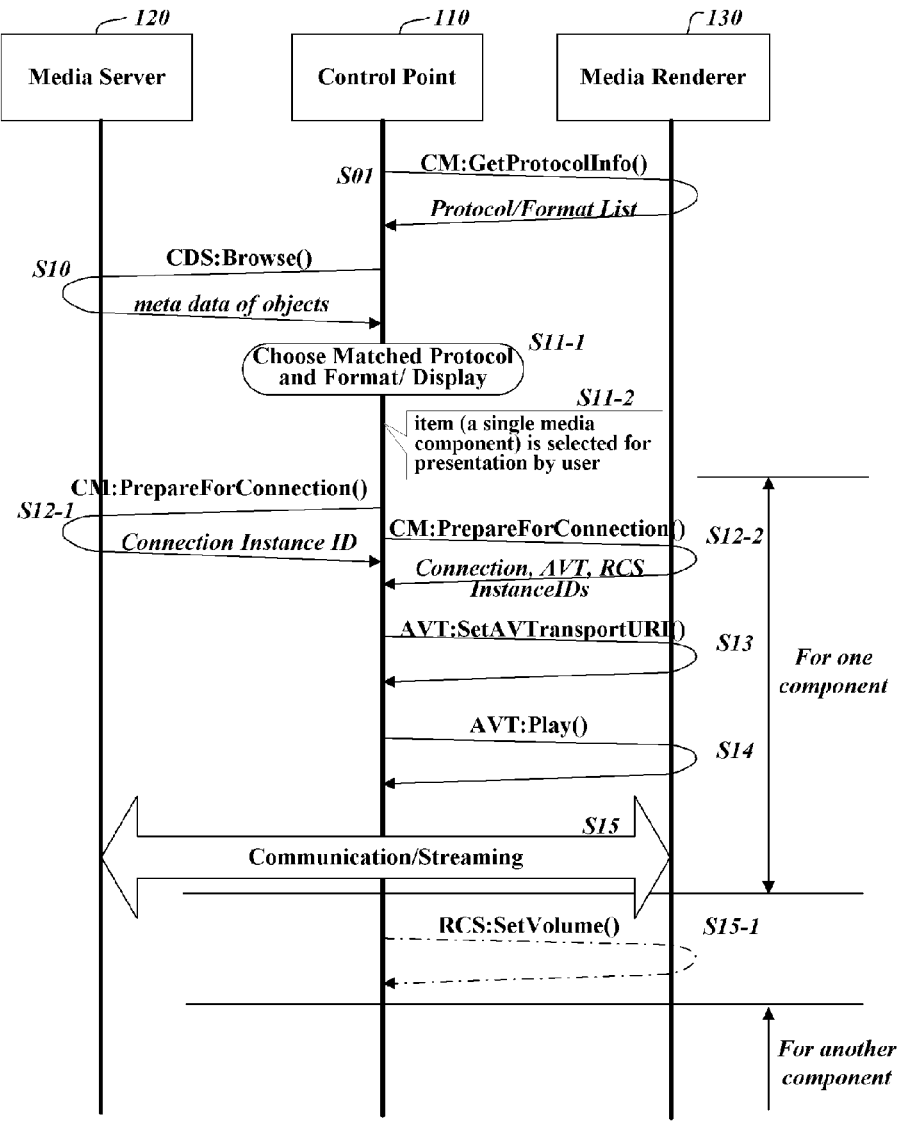
FIG. 2 illustrates a signal flow between devices and/or services during media playback carried out in a network of FIG. 1.
Figure 3:
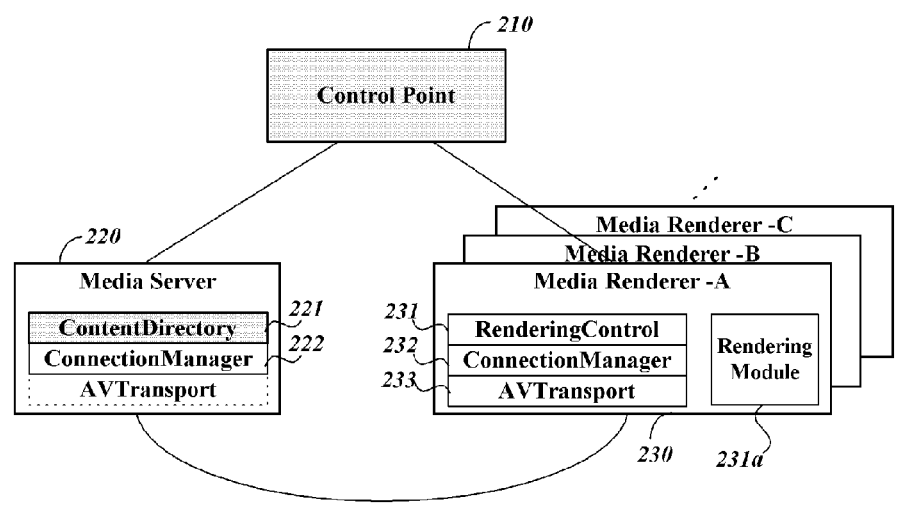
FIG. 3 illustrates structuring of item information for multi-source streaming and networked devices carrying out signal processing between devices and/or services for multi-source streaming.

FIG. 3 illustrates networked devices carrying out structuring of item information that enables multi-presentation of multiple sources pertaining to a selected item and signal processing between devices and/or services according to one embodiment of the present invention. In one embodiment of the present invention, a single content source indicates a multiple component; a multiple component comprises a plurality of components that are supposed to be presented preferably in association with each other. Streaming for presenting or playing more than one media sources, selected from those components, together through data transfer over a network is called 'multi-source streaming'. In addition, a single content source means a set of components whose contents to be presented are related mutually, and may contain a plurality of components of same attribute (examples of attribute are video, audio, text, image, slide-show etc.)

The network of FIG. 3 is a UPnP AV network comprising a control point 210, a media server 220, and multiple media renderers including a media renderer A 230. Although subsequent description of the present invention is given to networked devices and/or services based on UPnP standard, what are described in the following can be directly applied to other network standards by adaptively substituting necessary elements with regard to differences of the standards where the present invention may apply. In this regard, therefore, the present invention is not limited to a network based on UPnP.

A CDS 221 (which can be a processor that runs software) within the media server 220 carries out structuring of item information for multi-source streaming according to the present invention. In one embodiment of the present invention, the control point 210 plays a primary role in signal processing between devices and/or services for multi-source streaming according to the present invention by following a procedure illustrated in FIGS. 4 and 5. In the following, the illustrated procedure will be described later in detail.

Figure 4:
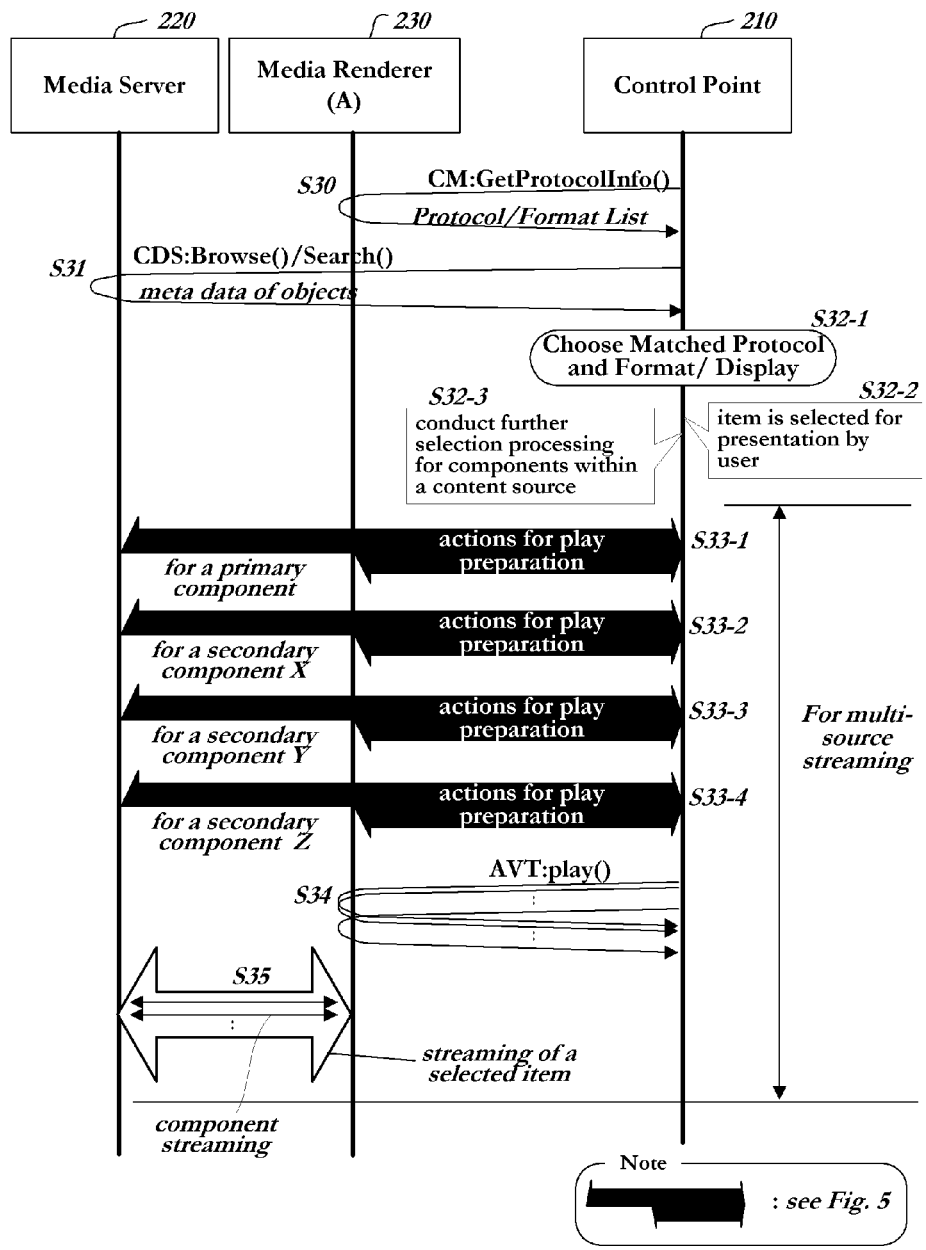
FIGS. 4 and 5 illustrate a signal flow between devices and/or services for multi-source streaming according to one embodiment of the present invention.
Figure 5:
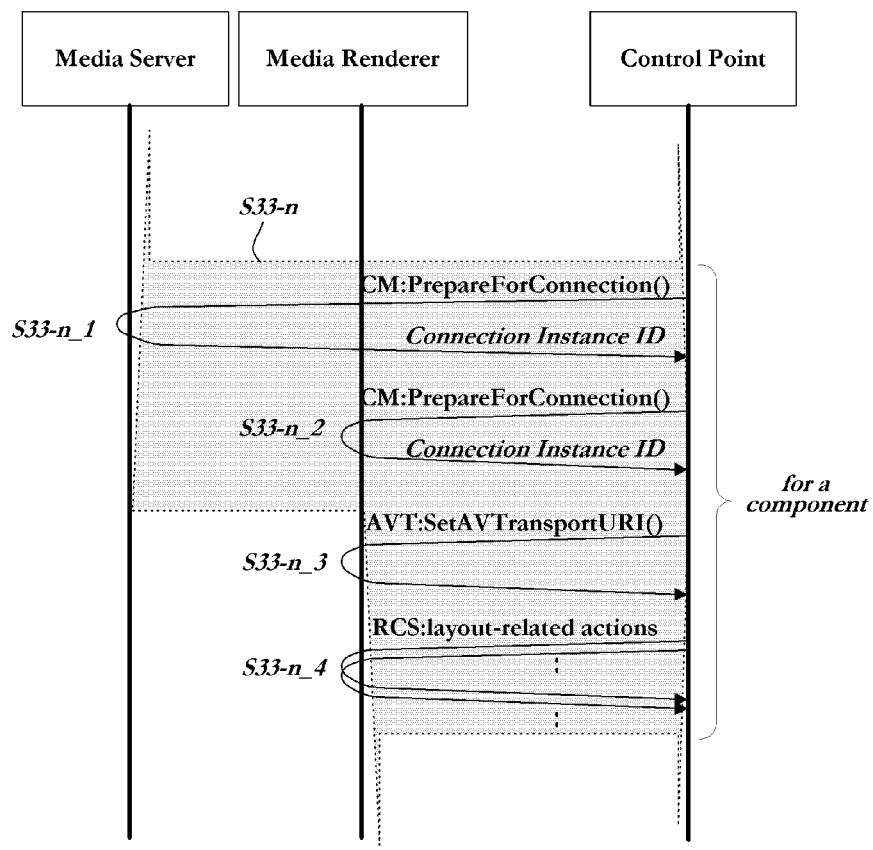

Configuration of devices and associated signal processing given in the below description are based on a pull mode, which is one of two modes for streaming a media component. The other mode is a push one. A difference between the two modes lies in the direction of an action; and which device is equipped with AVTransport service for playback management of streaming. That is, an AVTransport service adopting device is different in the two modes and accordingly, the destination of the action can only be either a media server or a media renderer (For instance, the actions SetAVTransport( ) and Play( ) shown in FIGS. 4 and 5 are invoked to a media server equipped with AVTransport service in case of push mode). Since the method for carrying out an action described below can be equally applied to both push and pull modes, the scope of the present invention is not limited by those modes illustrated in the drawings and descriptions.

Figure 6:
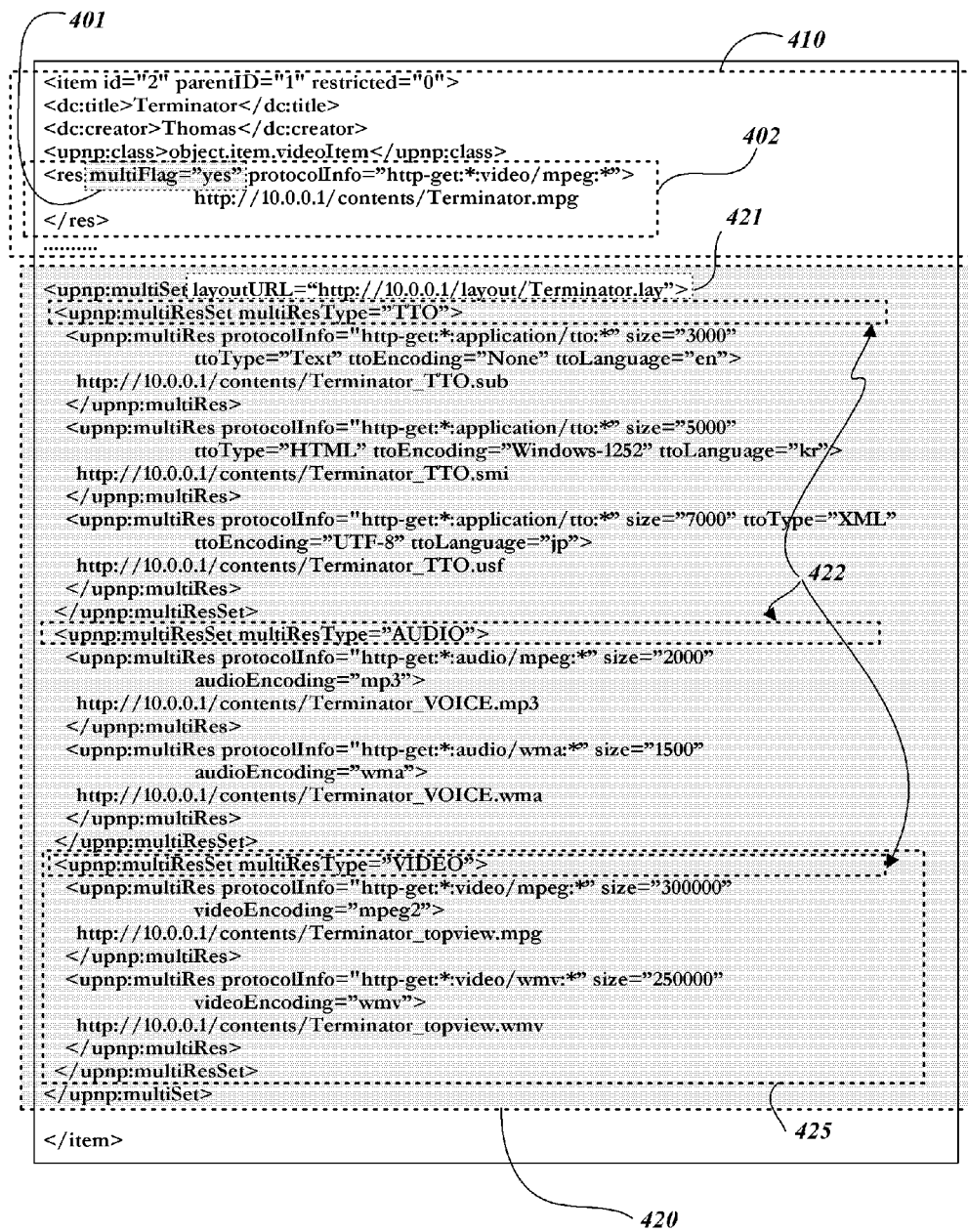
FIG. 6 illustrates a structure of item information containing information about additional or auxiliary component to be presented in association with a component pertaining to an arbitrary content source according to one embodiment of the present invention.

The CDS 221 within the media server 220 creates item information about content sources and components, namely meta data in a particular language (e.g., in XML format) by searching media files stored in a mass storage such as a hard disk or a separate removable recording medium such as an optical disk. Media files associated with each other for synchronized presentation are treated as a single content source and item information about the single content source is created. FIG. 6 illustrates an example of item information created by the aforementioned method. The item information illustrated in FIG. 6, for a primary component (e.g., an AV stream of video attribute) among components pertaining to a single item, includes a multi-set information structure element 420 as well as property information 410 prepared for guaranteeing independent selection and playback. The multi-set information structure element specifies information on auxiliary components that are presentable in synchronization with the primary component. The structure element 420 containing the multi-set information is also called as MSRB (Multi-Streaming Resource Bundle).

The CDS 221 examines interrelationship between media files considered as a single content source and whether a media file is a main component or an auxiliary component by utilizing, for example the name of each media file and/or extension of the file. If necessary, information about the property of each file—namely, whether the file is text or image and/or an encoding method—can also be obtained from the extension of the corresponding file. Information of each file can also be obtained by interpreting header information of the file. Alternatively, other application programs can write the aforementioned information in a database with respect to media files stored in a mass storage (or media files stored in a removable recording medium), the database (which can be pre-prepared and provided by a content provider) being located in the same recording medium.

In the above embodiment, the CDS 221 prepared item information about stored certain media files by treating the media files as a single content source, as illustrated in FIG. 6, after examining interrelationship between the media files. In another embodiment of the present invention, when preparing item information about a single content source, the CDS 221 may add item information about another content source (that is, a component or components whose content is not related with that of a primary content) into the multi-set information. Such a content-irrelevant component is called as an 'additional' component that is distinguished from an auxiliary component to be presented preferably in synchronization with a primary component. The term of 'secondary' component is used to indicate both additional component and auxiliary one in all.

Information about whether to insert information about a different content source in multi-set information included in item information about a single content source may be received from a user or media information provided together with the content sources. Alternatively, item information, pre-prepared as illustrated in FIG. 6, to which information about a different content source is added besides auxiliary components may be provided for the CDS 221 through a removable recording medium on which the content sources are stored.

The embodiment to prepare item information as shown in FIG. 6 is now explained in detail. If there is more media component related with a primary component (corresponding to a media file "Terminator.mpg" in the example of FIG. 6) of video attribute whose item information is being prepared now, the CDS 221, first, defines a new attribute parameter 'multiFlag' in a resource structure element 402 (structure element may be called as 'tag' hereinafter) within property information 410 and sets the attribute parameter like "multiFlag=yes" (401). In the meantime, the property information 410 defining protocol information and access location information about the primary component is prepared for enabling independent selection and playback. Afterwards, the CDS 221 prepares multi-set information 420, namely, additional information about multi-streaming resource bundle.

When preparing the multi-set information 420, the CDS 221 checks whether there is a layout data file (e.g., a file whose extension is 'lay') or information indicative of access path to the layout data file is written in a file of related media source, and then writes access location information of the layout data file as attribute parameter of a multi-set tag <multiSet> specifying multi-set information (421). The layout data file contains information (also called as 'display-layout information' hereinafter) for specifying display layout and video rendering conditions that are pre-defined by a content provider. The information contained in the layout data file is about the number of windows to be opened in a screen, location of each window, link information between a window and a media source to be presented therethrough, video rendering conditions and so on. The layout data file may further contain text and graphic or image to be displayed additionally for information announcement to a user, besides the information about windows through which a media source is presented. The information contained in the layout data file may be prepared in one among well-known mark-up languages.

Figure 7:
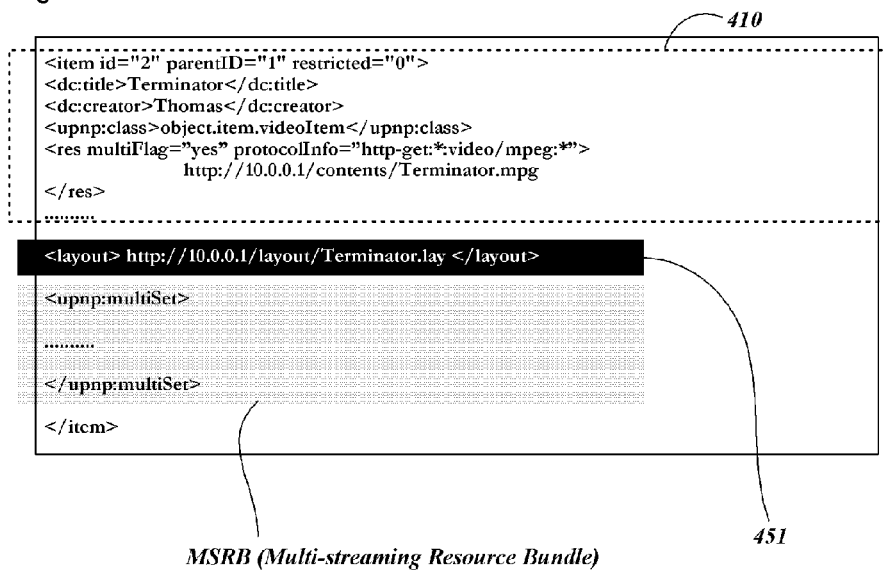
FIG. 7 illustrates a structure of item information created according to one embodiment of the present invention.

In another embodiment of the present invention, access location information about a layout data file containing display layout information may be written as a new tag of different name outside the MSRB. FIG. 7 shows an example of item information prepared in accordance with that embodiment. As shown in the example, the access location information of a layout data file is written in a new structure element 451, e.g., a tag whose name is 'layout'. As a matter of course, a different name can be defined and used. The new tag having such structural function can be interpreted accordingly by a control point.

Next, the CDS 221 groups auxiliary components associated with the primary component and/or an additional component by type, and it incorporates the same type of components into a single multi-resource-set tag <multiResSet> while preparing information (protocol information, access location information, etc.) about media sources in individual set member tags <multiRes>. At this time, type information of media sources accommodated by a multi-resource-set tag <multiResSet> is written as a value of attribute parameter 'multiResType' of the corresponding tag (422). The types may be different from the aforementioned attributes for media sources. For instance, types of video and audio are assigned for attributes of video (which may include audio signals) and audio respectively, however a type of 'tto' (timed-text overlay) may be assigned for all attributes of text, image and/or character-code.

When preparing a set member tag for each component, necessary information, for example, information on buffering size, encoding algorithm, tto system, expression language and so on is written as values of attribute parameters of a corresponding tag besides protocol information and access location information for each media source.

A multi-resource-set tag 425, whose attribute or type is same ("multiResType=VIDEO") with the primary component ('Terminator.mpg'), may be written in the multi-set information 420 as shown. Such case may happen in the event that there are one or more media sources containing video scenes seen at an angle different from that of a primary component on condition that a single content source provides multi-angled video contents, or in the event that there is one or more media sources containing data encoded in different coding manner from a primary component although they have same contents with the primary component. In addition, the aforementioned such case may happen even if contents are not related with each other. For example, a video component pertaining to a different content source can be also included as a single set member in the multi-resource-set tag 425 of video type in order to support multiview-presentation, e.g., PIP (Picture-In-Picture) presentation of separate content sources containing mutually different contents to increase viewer's interest.

Figure 8:
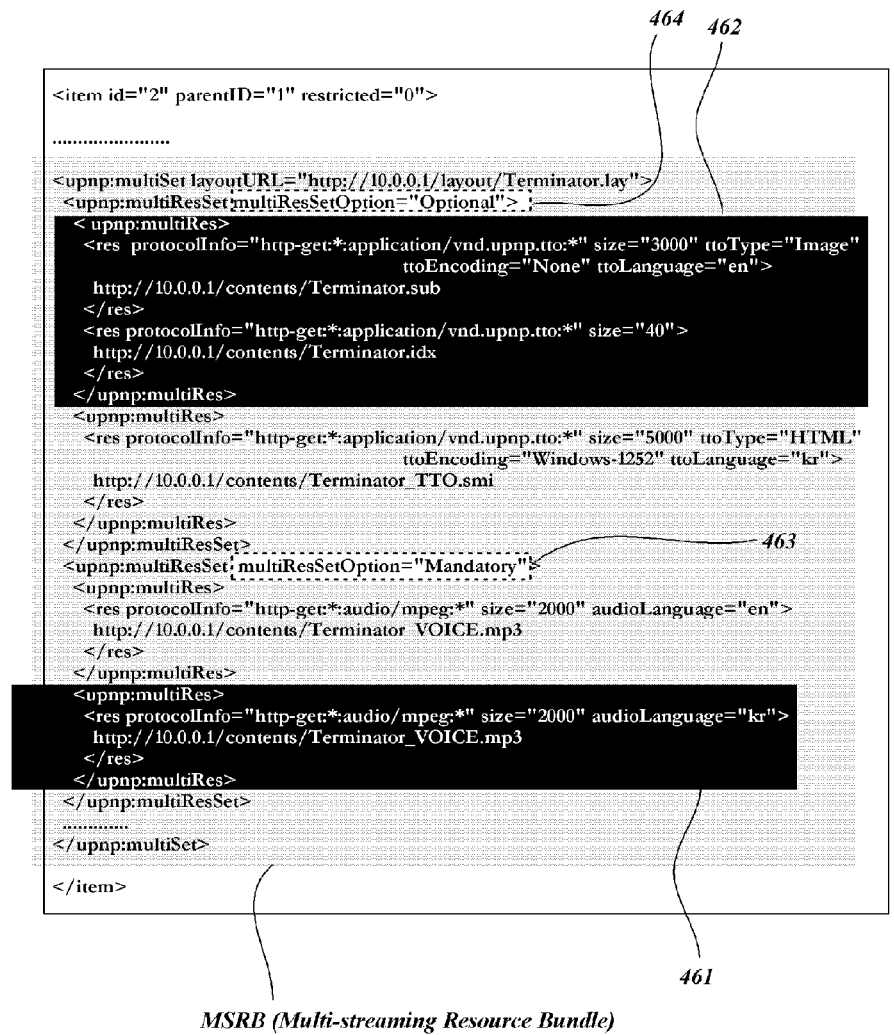
FIG. 8 illustrates a structure of item information created according to another embodiment of the present invention.

In another embodiment of the present invention, for each of auxiliary components associated with the primary component and/or an additional component, a resource tag <res>, which is used for specifying access location information, etc. for a primary component, is defined within a set member tag <multiRes> to include information on a corresponding component (461) as shown in FIG. 8, instead of writing information (protocol information, access location information, etc.) about a corresponding media source directly inside each set member tag <multiRes>. The embodiment of FIG. 8 is, for an arbitrary media source, to use same tag for specifying access location information, etc. about a resource irrespective of whether the arbitrary media source is for a primary component or for a secondary component. In an embodiment of the present invention, a plurality of resource tags may be defined and used within the set member tag. For instance, in the event that a media file contains text or image data for displaying subtitle and another media file contains timing information for synchronizing the text or image data with data of a primary component, the two media files should be selected together. Resource tags for such media files are written inside a single set member tag <multiRes>(462) while access location information for each media file is defined by a separate resource tag <res>. In addition, in an embodiment of the present invention, secondary components (auxiliary components and/or an additional component) associated with the primary component are classified by their type, components of same type are incorporated into a single multi-resource-set tag <multiResSet>. However, unlike the previously-explained embodiment, type information of components included in a corresponding multi-resource-set tag is not written. Instead, information about at least one of components included in a corresponding multi-resource-set tag contains information 463 or 464 indicative of whether the at least one component should be chosen along with a primary component when the primary component is to be played. In the prepared example of FIG. 8, the indicating information is embodied by the attribute parameter 'multiResSetOption' within a multi-resource-set tag. If the attribute parameter is set to a value of 'Mandatory' (463) at least one among set member tags included in a corresponding multi-resource-set tag should be selected, if a value of 'Optional' (464) it means that at least one is not necessarily selected.

The name of each individual structure element used in FIG. 6 (e.g., <multiSet>, <multiRes>) is only an example. Utilizing a different name not indicated in the present invention for achieving the same functionality provided by a tag adopted in the present invention is equally acceptable.

When a user selects an item after its information prepared as illustrated in FIG. 6 is provided for the CP 210, the CP 210 is able to judge, from a value of the attribute parameter 'multiFlag' within a resource tag <res> specifying protocol information and access location information of a primary component, whether the selected item is for a content supporting multi-source streaming. If the selected item is judged as a content for multi-source streaming the CP 210 analyzes the multi-set information 420 and enables a user to select a media source from a multi-resource set of each type. If the value of 'multiFlag' is "NO" or "FALSE" or if there is no attribute parameter of 'multiFlag' inside a resource tag, the CP 210 does not search for a multi-set tag <multiSet> containing multi-set information.

Item information about a content source prepared as shown in FIG. 6 is transferred from the CDS 221 to the CP 210 in response to a browsing action or a search action and are interpreted by the CP 210. According to the interpretation, the CP 210 provides the user with relevant information for selecting content and/or a component to play. According to the user's input, an operation of multi-source streaming is carried out. Detailed descriptions of the operation are given below.

FIGS. 4 and 5 illustrate a signal flow between devices and/or services for multi-source streaming according to one embodiment of the present invention. Item information created by CDS 221 within the media server 220 through the aforementioned method is transferred from the CDS 221 to the CP 210 by a browsing action or a search action of the CP 210 (S31). As a matter of course, before the above action, as shown in FIG. 4, the CP 210 requests and obtains supported protocol information from all of media renderers including a media renderer A 230 (S30).

The CP 210, from among information of objects and content sources received from the step S31, provides the user through an appropriate user interface (UI) only with those objects (items) having protocol information supported by the media renderer A 230 that the user has specified for presentation of content (S32-1). At this time, the CP 210 analyzes information received by an action and carries out subsequent operations (S32-2) that allow the user to select a desired content and a component within the content.

Figure 9:
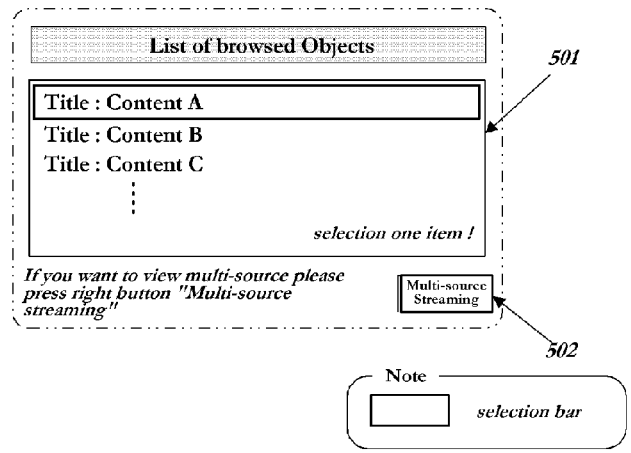
FIGS. 9 and 10 respectively show examples of a user's selection screen provided according to one embodiment of the present invention such that a user selects a content source from the user's selection screen.

The CP 210 extracts, from the received item information, only item information of content sources capable of supporting streaming of a single component, e.g., item information in which an attribute parameter 'multiFlag' is not defined inside a resource tag or is set as inactive, and it lists the extracted item information (501) as shown in FIG. 9. If the received item information includes item information supporting multi-source streaming, for example, if there is item information in which an attribute parameter 'multiFlag' inside a resource tag is set as active and a multi-set tag <multiSet>, namely MSRB structure element is written accordingly, a menu or a button 502 by which a user can select multi-source streaming may be provided on a screen. If a user requests 'multi-source streaming', the CP 210 provides, from the received item information, a screen listing items whose information has an active-set attribute parameter 'multiFlag' inside a resource tag and a multi-set tag prepared accordingly, thereby allowing a user to select one content source, namely an item from the listed items. To help a user make a selection, for each item, the CP 210 may display information inside <title> tag written in the item information on the screen.

Figure 10:
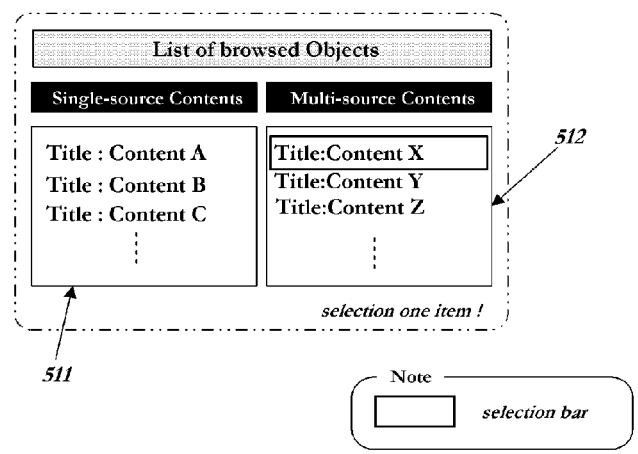

In another embodiment according to the present invention, information received through an action is analyzed and if item information supporting multi-source streaming is included, a window of contents 511 for single-source streaming and another window of contents 512 for multi-source streaming are displayed together separated from each other as shown in FIG. 10. If an item is selected from a selection screen provided as shown in FIG. 9 or 10 and the selected item is for a content source supporting multi-source streaming, the CP 210 conducts the following operations 532-3 for the selected content source in order that selections are made for components pertaining to the content source.

Figure 11:
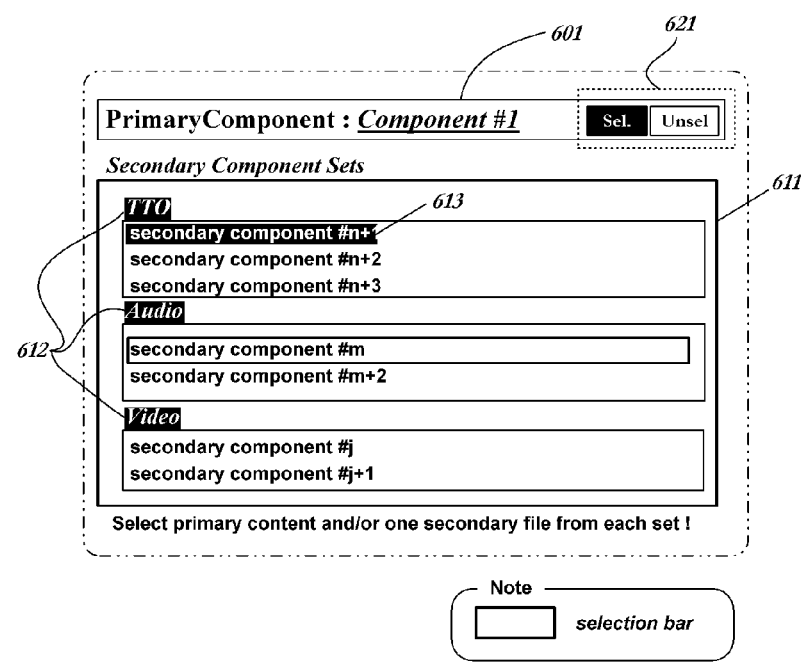
FIG. 11 illustrates an example of a user's selection screen provided according to one embodiment of the present invention such that a user selects media sources pertaining to a content source in the event that a selected item is a content source for multi-source streaming.

First, the CP 210 displays information indicative of a primary component of a selected item, for example, filename information written in access location information of a resource tag <res>, on top of the screen (601) as illustrated in FIG. 11, and then provides selection sets (611), each being grouped by same type and corresponding to each of multi-resource-set tags <multiResSet> included in multi-set information. One or more components are selected from each of the provided selection sets or any component may not be selected therefrom.

When displaying a plurality of selection sets for a user as shown in FIG. 11, the CP 210 may provide, on top of each selection set, type information on each selection set (612), for example, information indicative of whether a selection set is tto, audio or video. The CP 210 may obtain information needed for such displaying from a corresponding attribute parameter within a multi-resource set tag <multiResSet>. In another embodiment, the CP 210 may obtain that information from protocol information ("protocolInfo=*") defined for each component by a resource tag <multiRes>.

In the process for user's component selection, a component already selected from other selection set is marked (613) to be distinguished from not-selected components in order that a user may know easily what components are selected. For instance, the selected component is displayed inversely.

In an embodiment of the present invention, a primary component 601 of a selected content source may not be selected for presentation For supporting un-selection of a primary component, the CP 210 provides a UI 621, as illustrated in FIG. 11, for enabling a primary component of a selected item to be not selected as well as to be selected. Default of the UI 621 is state of selected and state of not-selected is set on a corresponding input. The situation that a primary component of a selected content source is not selected for actual streaming occurs in the event that a multi-resource set of video type within the multi-set information includes a component which is encoded in different coding system from the primary component and has same contents with the primary component. For instance, in a case that primary component is corresponding to "Terminator.mpg" encoded in mpeg system and another media source "Terminator.wmv" encoded in window media video (wmv) system is also provided, it is necessary for the primary component of a selected item not to be selected in order that the media source "Terminator.wmv" can be selected for playback by a user instead of "Terminator.mpg".

In the meantime, a user may not perform detailed selection for components within a selected content source. In an embodiment of the present invention, in such a case, the CP 210 may select components to be streamed within a selected content source by using a default method. For example, the CP 210, if detailed selection is not carried out for components within a selected content source, a media source specified by a head resource tag <multiRes> within each multi-resource-set tag <multiResSet> is selected as a streaming component. In another embodiment of the present invention, supporting a case that no component within a multi-resource-set tag <multiResSet> is selected, an attribute parameter may be defined and used for indicating that a particular component has been selected. For example, as in <multiRes default=TRUE.>, it can be specified that the corresponding media source is a component to be selected in default. In another embodiment, illustrated in FIG. 8, of the present invention, one set member tag <multiRes>, namely a component or components pertaining thereto should be selected from a multi-resource-set tag <multiResSet>, corresponding to a selection set, whose attribute parameter 'multiResSetOption' is set to "Mandatory".

According to the procedures explained above, when selections of a primary component and/or secondary components of a selected source are completed, the CP 210 obtains, from associated structure elements, protocol information and URL information about each selected component. That is, in the item information illustrated in FIG. 6, the CP 210 obtains the protocol and URL information from information written in tag <res> or <multiRes> of each of the selected components.

If protocol information of a component obtained from the above procedure is not compliant with the protocol supported by the media renderer A 230 (which is destined by a user for a device for presentation), the corresponding component is ignored and operations for presentation at the media renderer A 230 described below are not carried out for the component. Instead, the user may receive an alarm message saying "The selected component cannot be played at the destined media renderer !".

The CP 210 conducts preparing operations for simultaneous play of media sources (S33-$n$, n=1, 2, . . . ) when protocol information and URL information of each component pertaining to the media sources are identified. The example of signal flow shown in FIG. 4 is about a case that four components (one primary component, three secondary components of one tto-typed component, one audio-typed component and one video-typed component) are selected from a selected item. In the example, same preparing operation is conducted four times between devices and/or services (S33-1,S33-2,S33-3,S33-4). The video-typed secondary component may be a component having contents viewed at different angle from the primary component, having contents encoded in different coding system from the primary component, or having video contents different from the primary component.

Specific illustration of actions carried out at each preparation operation is given in FIG. 5. As illustrated in FIG. 5, an action is carried out for a single selected component and an input argument of the action carries adequate information for the component.

Signal processing between devices and/or services illustrated in FIG. 5 is described in detail. The CP 210 invokes actions for preparing connection (PrepareForConnection( )) from the media server 220 and the media renderer A 230 respectively for a corresponding component and receives connection information, for example instance ID assigned by participating elements (services) required for presentation through streaming (S33-n_1, S33-n_2). The received instance IDs are used for later specifying and controlling the corresponding component employed by a current streaming service. If the CP 210 receives an instance ID for connecting the component through the action for preparing connection (the instance ID is a set of IDs assigned to each service for a current connection. It is called, however, an instance ID for the sake of convenience. In what follows, if description, e.g., name of each individual service is not given before or after an ID, the instance ID represents a set of instance IDs about individual services assigned to a single connection), the CP 210 sets access location information about previously selected components, for example URL information respectively to AVTransport service 233 (S33-n_3).

In addition, the CP 210 obtains a layout data file ("Terminator.lay" in FIG. 6, 7 or 8) based on information of the selected item and analyzes the obtained file. Access location information about the layout data file can be known from a value of an attribute parameter (in case of the embodiment of FIG. 6 or 8) inside a multi-resource-set tag (i.e., MSRB structure element) of the selected item, or from information specified by a particular tag (in case of the embodiment of FIG. 7) located outside the multi-resource-set tag. The obtaining and analyzing of the layout data file may be conducted before the play preparing operations. If the analyzed results indicate that the layout data file specifies display layout and/or video rendering conditions for a component which play preparation is being conducted for, the CP 210 invokes, to a RenderingControl service 231 of the media renderer A 230, actions necessary for setting the layout and/or conditions thereto (S33-n_4). Display layout and/or video rendering conditions predefined by a content provider are set onto the media renderer A 230 through the actions invoked according to analyzed results of the layout data file. After being set in accordance with the pre-definition, the set display layout and/or video rendering conditions may be changed by commands requested from a user if necessary. As a matter of course, the CP 210 provides adequate UI for a user so that a user enters or selects desired commands for changing display layout and/or video rendering conditions.

Actions invoked for setting display layout and/or video rendering conditions include at least one of actions illustrated in FIG. 12, which shows the following actions: an action for setting/querying location of a display window (SetRenderingPosition( ),GetRenderingPosition( )); an action for setting/querying aspect ratio of a display window (SetRenderingAspect( ),GetRenderingAspect( ); an action for setting/querying blending ratio of a display (foreground) image and a background image (SetRenderingBlend( ),GetRenderingBlend( )); an action for setting/querying On/Off state of a display window (SetRenderingShow( ),GetRenderingShow( )); an action for setting/querying states or conditions of volume, brightness, contrast, and so on as well as rendering information, e.g., display layout of a window and display conditions (blending or show, etc.) (SetRenderingInfo( ),GetRenderingInfo( ); and an action for querying states (e.g., resolution capacity, bit-depth, etc.) set in rendering hardware (GetDisplayInfo( )). Specially, the action for querying states set in rendering hardware may use an instance ID for group connection in its input argument instead of an instance ID for individual connection (701). The instance ID for group connection will be explained in detail later. Before invoking an action for display layout and/or video rendering conditions specified by the layout data file, the CP 210 may invoke an action GetDisplayInfo( ) shown in FIG. 12 to know whether the display layout and/or video rendering conditions can be supported by the media renderer A 230 which multi-source streaming is destined for. If information about display hardware received through the action GetDisplayInfo( ) does not support the display layout and/or video rendering conditions demanded by the layout data file, the CP 210 ignores unsupportable display layout and/or video rendering conditions.

Other necessary actions may be further defined and used in addition to the illustrated actions if needed for more flexible preparation of contents written in the layout data file. In the meantime, the RenderingControl service 231 defines and uses state variables, as illustrated in FIG. 13, needed for supporting actions shown in FIG. 12. Values of the state variables, illustrated in FIG. 13, except the state variable 'DisplayInfo' for states of display hardware can be set by relevant actions illustrated in FIG. 12.

In another embodiment in accordance with the present invention, instead of interpreting an obtained layout data file and invoking actions to the RenderingControl service 231 according to the interpretation, the CP 210 conducts the above-explained play-preparing operations even for the layout data file like for the components. For instance, if the number of components chosen by a user is four, the CP 210 conducts play-preparing operations illustrated in FIG. 5 five times, inclusive of a layout data file. At this time, it is a matter of course that the invocations of rendering-related actions S33-n_4 in FIG. 5 are not performed. In the present embodiment, when a play action is invoked later, the RenderingControl service 231 analyzes a layout data file after receiving it. Afterwards, the RenderingControl service 231 sets state variables of FIG. 13 according to the analyzed results, and constructs a display screen and determines video rendering conditions to be matched with the set state variables. Since access location information, e.g., URL for identifying each of components uniquely is written in the layout data file but instance ID is not, the RenderingControl service 231 is able to know an instance ID of RCS assigned for a certain component based on the URL information written in the layout data file and an instance ID received through an invoked access location information setting action "SetAVTransportURI( )". Thus, the RenderingControl service 231 also writes the known instance ID of RCS for a related media source in a state variable prepared for layout or video rendering conditions for a certain component.

For the sake of convenience for drawing diagrams and description, it has been described that an action for preparing connection, an action (SetAVTransportURI( ) for setting access location information and display-layout related actions are carried out sequentially according to the order of each component, but it does not necessarily follow the aforementioned order of performance. For example, after completing actions for preparing connections with respect to a primary component and additional components X, Y and Z, actions for setting access location information and display-layout related actions can be sequentially invoked for the primary component and the additional components X, Y and Z. A display-layout related action or an action for setting access location information upon an arbitrary component may be invoked any time once an action for preparing connection has been previously invoked on the corresponding component. Under the above conditions, therefore, various methods for invoking a connection preparing action, an access location information setting action, and display-layout related actions for components pertaining to a selected content source can be employed in addition to the aforementioned method. In another embodiment of the present invention, after conducting all of connection preparing actions (excluding the action S33-n_4 in FIG. 5) for components chosen by a user, display-layout related actions may be invoked in concentrated way according to information contained in an obtained display-layout data file.

In another embodiment in accordance with the present invention, protocol information and access location information for a media source associated with layout information of an arbitrary display window may be written in the layout data file. In this case, protocol information may not be written as an attribute parameter inside a multi-resource-set tag <multiResSet> within the multi-set information 420 of item information for multi-source streaming illustrated in FIG. 6. In the present embodiment, when the CP 210 provides a selection screen, as shown in FIG. 11, for components pertaining to an item selected from item selection screen like FIG. 9 or 10 by a user, it lists only components whose protocol information of media source written in a layout data file of the selected item can be accepted by the media renderer A 230 that is destined to play by a user.

After access location information setting actions and display layout related actions are invoked for all of selected components and then successful responses are received accordingly, a play action is invoked to an AVTransport service 233 for each component (S34). Preferably, play actions are invoked at the same time.

The AVTransport service 233 of the media renderer A 230 that received the play action for each component makes a component about a connection specified by an instance ID of input arguments of each playback action be streamed or downloaded through relevant information exchange procedures with a media server 220. Accordingly, components are streamed or downloaded from the media server 220 and under control of RenderingControl service 231, are decoded and outputted by a rendering module 231a that consists of corresponding decoders (or a decoder of integrated functions) (S35). At this time, auxiliary components, e.g., resources of subtitle or voice data to be played in synchronization with a primary component are decoded out in synchronization with and along with the primary component under control of the RenderingControl service 231, and a window through which an arbitrary component is presented is determined according to values of state variables, shown in FIG. 13, set in association with instance ID of RCS assigned for the arbitrary component. In one embodiment according to the present invention, if there is a resource related with display layout among the downloaded resources, the RenderingControl service 231 analyzes data obtained from the display layout resource and sets state variables corresponding to each component (corresponding to an instance ID of RCS assigned for the component) to proper values according to the analyzed results before starting to decode data downloaded or being streamed to the rendering module 231a.

In another embodiment according to the present invention, a multi-source streaming may be conducted onto a plurality of renderers by dividing the components between the plurality of renderers. For instance, a primary component and a tto-typed auxiliary component pertaining to a selected item are directed to a media renderer A, an audio-typed auxiliary component directed to a media renderer B, and a video-typed auxiliary or additional component directed to a media renderer C. Connection preparing actions, access location information setting actions, and play actions are invoked according to such component division between renderers. It is a matter of course that necessary actions except the play actions may be invoked irrespective of the order of the media renderers and time. However, the play actions are invoked after a success response with respect to the last of actions required for each media renderer has been received. It is preferable that invocation of play actions upon the media renderers are carried out simultaneously. In the event that the multi-source streaming is to be performed through more than one media renderer, when the CP 210 interprets an obtained layout data file and invokes actions according to the interpretations, it invokes display-layout related actions to a media renderer to which streaming of corresponding components is directed. In another embodiment according to the present invention, the CP 210 provides, through play preparing actions, same layout data files for all of the media renderers that will receive one or more components. Each of the media renderers ignores a part of the layout data file related with a media source, whose access location information is not set to itself through actions, while interpreting the layout data file received through play preparing actions.

Figure 14:
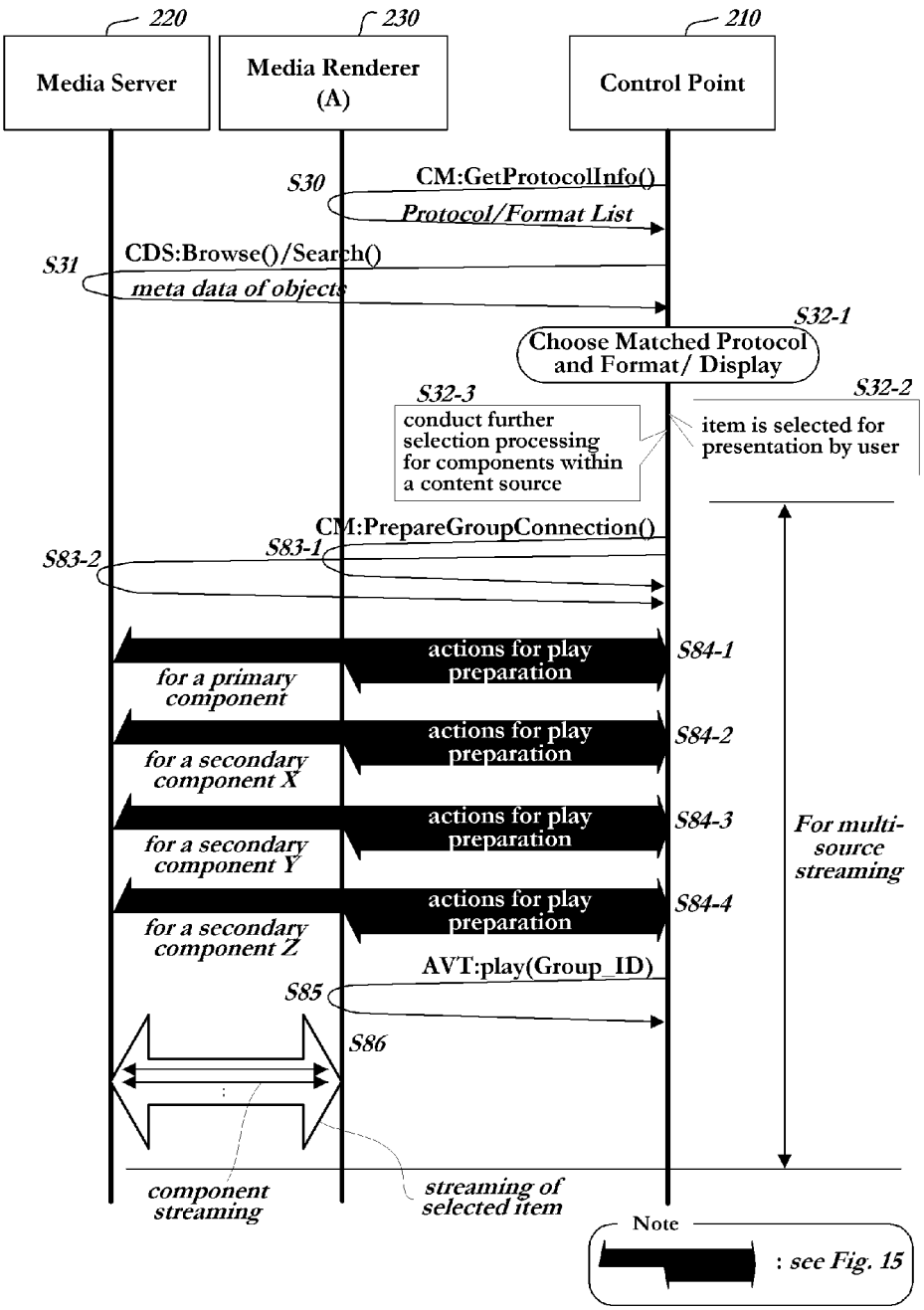

In another embodiment according to the present invention, connections for respective components are grouped and by using an identifier for the grouped connections (hereinafter, it is called 'group connection'), multi-source streaming is carried out for a selected item. FIGS. 14 and 15 illustrate a procedure for multi-source streaming according to the present embodiment.

Since the steps of S30, S31, and S32-1 through S32-3 in the figure are the same steps described with reference to FIG. 4, further descriptions are not given. The CP 210 first invokes an action for preparing group connection (PrepareForGroup-Connection( )) onto CM service 222, 232 of each device (a media server 220 and a media renderer A 230) (S83-1, S83-2). Since the action for preparing group connection has the same structure 901 illustrated in FIG. 16, group connection information, for example a virtual instance ID (GroupConnectionID for a ConnectionManager service, GroupAVTID for an AVTransport service, and GroupRCSID for a Rendering-Control service) is received in response to the invocation from the media server 220 and the media renderer A 230 being carried by output arguments. The virtual instance ID represents an instance ID not corresponding to an actual connection; the virtual instance ID is treated as a virtual ID for identifying a group connection. The ConnectionManager service defines and uses a state variable structured as FIG. 17 for an instance ID for a group connection.

The CP 210 carries out operations for preparing multi-source streaming to be applied for each of components whose protocol information and URL information are identified (S84-n, n=1, 2, . . . ). The signal processing example of FIG. 14 describes, like FIG. 4, a case where four components (one primary component and three secondary components X, Y and Z) within item information are selected and four same preparation operations (S84-1, S84-2, S84-3, S84-4) are carried out between devices and/or services. In one embodiment according to the present invention, preparing operations for a primary component (a component specified by a resource tag <res> within item information) may be carried out first of all in order that services involved in preparing operations may distinguish the primary component from other ones. Specific description about actions carried out during each preparation operation is given in FIG. 15. As shown in FIG. 15, an action is carried out for a single component and an input argument has adequate information for a corresponding component.

Signal processing between devices and/or services illustrated in FIG. 15 is described in detail.

The CP 210 invokes connection preparation actions (PrepareForConnection( )) for an individual connection (this term of 'individual connection' is intended to express a substantial connection created for a single component in contrast with a 'group connection') for a corresponding component to the media server 220 and the media renderer A 230 respectively, and receives an instance ID assigned by participating services to be involved in presentation through streaming between devices (S84-n_1, S84-n_2).

When the CP 210 receives an instance ID of each participating service (CM, AVT, or RCS) about individual connection for a corresponding component through actions for preparing connection, the CP 210, to register received instance IDs about individual connection in a connection group, invokes an action (AddtoGroup( )) for adding to a group that has the structure 902 illustrated in FIG. 16 (S84-n_3, S84-n_4). The action for adding to a group is for linking an instance ID for individual connection with an instance ID for group connection (a virtual instance ID assigned for identifying a group connection) received (S83-1, S83-2) previously through the action for preparing group connection. At this time, input argument of the action for adding to a group includes an instance ID of each service for group connection and an instance ID of each service for individual connection to be registered in the group connection according to the structure illustrated in FIG. 16. In another embodiment according to the present invention, the actions for adding to a group may be invoked sequentially instance ID by instance ID.

Although a connection preparation action for individual connection is invoked for a component (S84-n_1, S84-n_2) after a group connection preparation action for group connection has been invoked (S83-1, S83-2) in the embodiment of FIG. 14, invocation of the action can be carried out in a reverse order. In other words, it is sufficient that by carrying out a group connection preparation action and a connection preparation action for individual connection irrespective of the order, an instance ID for individual connection to be added to a group and an instance ID for a group connection are prepared before carrying out the action for adding to group.

The CM service 222 or 232, after receiving an action for linking the instance ID, constructs management information for mapping an instance ID for group connection contained in each group addition action onto an instance ID for individual connection. FIG. 18 illustrates an example of management information for grouping individual connections (since the media renderer A 230 of FIG. 3 is equipped with AVTransport service 233 and an instance ID about AVTransport service has been provided by a connection preparation action in response to the action, the instance ID of AVTransport service is included in an instance ID for a connection), the management information being constructed by ConnectionManager service 232 within the media renderer A 230. FIG. 19 illustrates a conceptual scheme where instance IDs are structured for group and individual connection according to the management information constructed in FIG. 18. In addition to mapping information about instance IDs illustrated in FIG. 18, if there exists additional information (for example type, information about whether an individual connection is a primary or a secondary component, and the like) received through input arguments of an action for preparing group connection and an action for adding to group, the received information and/or information created according to whether initial action invocation or not is also stored as management information and thus managed by the CM service 222 or 232. For instance, if a certain individual connection is primary, an instance ID for the certain individual connection may be written at head 1001 of instance IDs in the mapping information about instance IDs shown in FIG. 18 in order for the instance ID for the certain individual connection to be distinguished from other IDs of individual connections.

After construction of mapping information illustrated in FIG. 18, each ConnectionManager service 222, 232, in response to the request from the CP 210 for later playback management or rendering control using an instance ID for group connection, identifies an instance ID for individual connection corresponding to a service requested for an action and uses the identified instance ID, thereby determining the corresponding resources being used. It is a matter of course that an instance ID for individual connection can be used by the CP 210 even in an embodiment where a group connection is defined and used.

After grouping individual connections through the above-explained operations, an action "SetAVTransportURI( )" for setting access location information (e.g., URL information) about a corresponding component to AVTransport service 233 is invoked (S84_n_5).

In addition, the CP 210 analyzes a layout data file ('Terminator.lay' in FIG. 6, 7 or 8) associated with information of the selected item in the same manner as is done in the embodiments of FIGS. 4 and 5. If the layout data file stores information about display layout for a component which preparing operations are conducted for, the CP 210 invokes necessary rendering-related actions in order for the specified layout to be set to the RenderingControl service 231 of the media renderer A 230 (S84-n_6). The actions invoked at this time are among the setting actions illustrated in FIG. 12.

Even in one embodiment of the present invention that uses a group connection, instead of analyzing an obtained layout data file and invoking actions to the RenderingControl service 231 according to the analysis, the CP 210 may conduct the above-explained play preparing operations for the layout data file like other components in order for the RenderingControl service 231 to obtain the layout data file, to analyze the layout data file and to construct display layout according to the analysis. In the event that the RenderingControl service 231 obtains the layout data file as aforementioned, it is a matter of course that invocations S84-n_6 of display layout related actions of FIG. 15 are not conducted. The methods how the RenderingControl service 231 associates a component written in the layout data file with an instance ID carried by an action for display layout and how the action for display layout is invoked are omitted herein since the methods are same with the above explanation about embodiments according to FIGS. 4 and 5.

After completing play preparing operations for components selected for multi-source streaming (after completing the operation S84-4 in the example of FIG. 14), the CP 210 invokes a single play action onto the AVTransport service 233. The play action invoked at this time uses an instance ID 'GroupAVTransportID' of AVTransport service for group connection (S85) that was received before. The instance ID of AVTransport service for group connection carried by the play action is translated to instance IDs of AVTransport service for individual connections by a ConnectionManager service 232. The translated instance IDs of AVTransport service for individual connections are delivered to the AVTransport service 233 in order for play operations for relevant individual connections to be started at the same time. Afterwards, all of components selected from item information start to be streamed or downloaded from the media server 220 through adequate information communication between the media renderer A 230 and the media server 220, and all the components being streamed or downloaded are decoded out altogether by the rendering module 231a under control of the RenderingControl service 231 (S86). At this time, auxiliary components that must be played back in synchronization are presented synchronously each other. If necessary, all the components start to be decoded after a layout data file is analyzed first.

As aforementioned, a user may request presentation of selected components onto more than one media renderers. In this case, the CP 210 does not make a group connection with all the selected components. Instead, the CP 210 makes each group connection for each group of components that are directed to a same media renderer. That is, a plurality of group connections are made. It is a matter of course that a group connection is made for a media renderer only if the component to be streamed to the media renderer is more than one. The CP 210 analyzes a layout data file and invokes actions to a media renderer that will make rendering of a corresponding component, or the CP 210 distributes the layout data file to all of media renderers to be involved in presentation in order that each media renderer may set display layout by considering only a part of the layout data file that is related with a component or components to be rendered by the each media renderer.

While operations of presentation being carried out according to the above procedures (S35, S86), if a request for controlling a playback operation with respect to particular content or components (playback stop, temporary stop, search, trick play, etc), a request for changing rendering state (adjustment of volume, stopping audio output, adjustment of brightness, etc), or a request of display layout change is made by the user, the CP 210 requests the corresponding action (e.g., AVT:Stop( ), AVT:Pause( ), RCS:SetVolume( ), RCS:SetMute( ), RCS:SetRenderingPosition( ), etc.) from a media renderer. In response to the request, an instance ID for a group connection assigned to multi-source streaming in service or an instance ID for an individual connection can be employed. For the case of using an instance ID for an individual connection, since a device or a service invoked by an action can immediately recognize a connection corresponding to the instance ID and resources assigned to the connection, operations requested by an action with respect to the connection or resources are carried out.

In case of using an instance ID for a group connection, a service that receives an action, when the instance ID for an individual connection corresponding to the action is specified by a single instance ID, maps the instance ID for an individual connection directly onto the instance ID of the corresponding group connection and carries out operations for a individual connection of the instance ID, for example control operations. For instance, when individual connections corresponding respectively to the components of video, audio, and text attribute are set up as a group connection and a Volume( ) action that adjusts loudness of sound has been received through an instance ID of the group connection, the instance ID of the group ID can be directly translated to the instance ID of a connection set up for an audio-typed component from among instance IDs for the four individual connections.

However, in the event that the above-mentioned direct translation is not easy (for example, in a case that there are more than one components of the same type), when a particular action is invoked, an instance ID for individual connection pertaining to a group connection is searched for and then used, which is described hereinafter.

By grouping individual connections through the procedures as described above and delivering required information to a related service through actions, a user can select a desired one from among grouped individual connections and carry out querying about or controlling the selected one connection through the CP 210 that created a corresponding group connection or through a different CP that has participated newly in the network.

Figure 20:
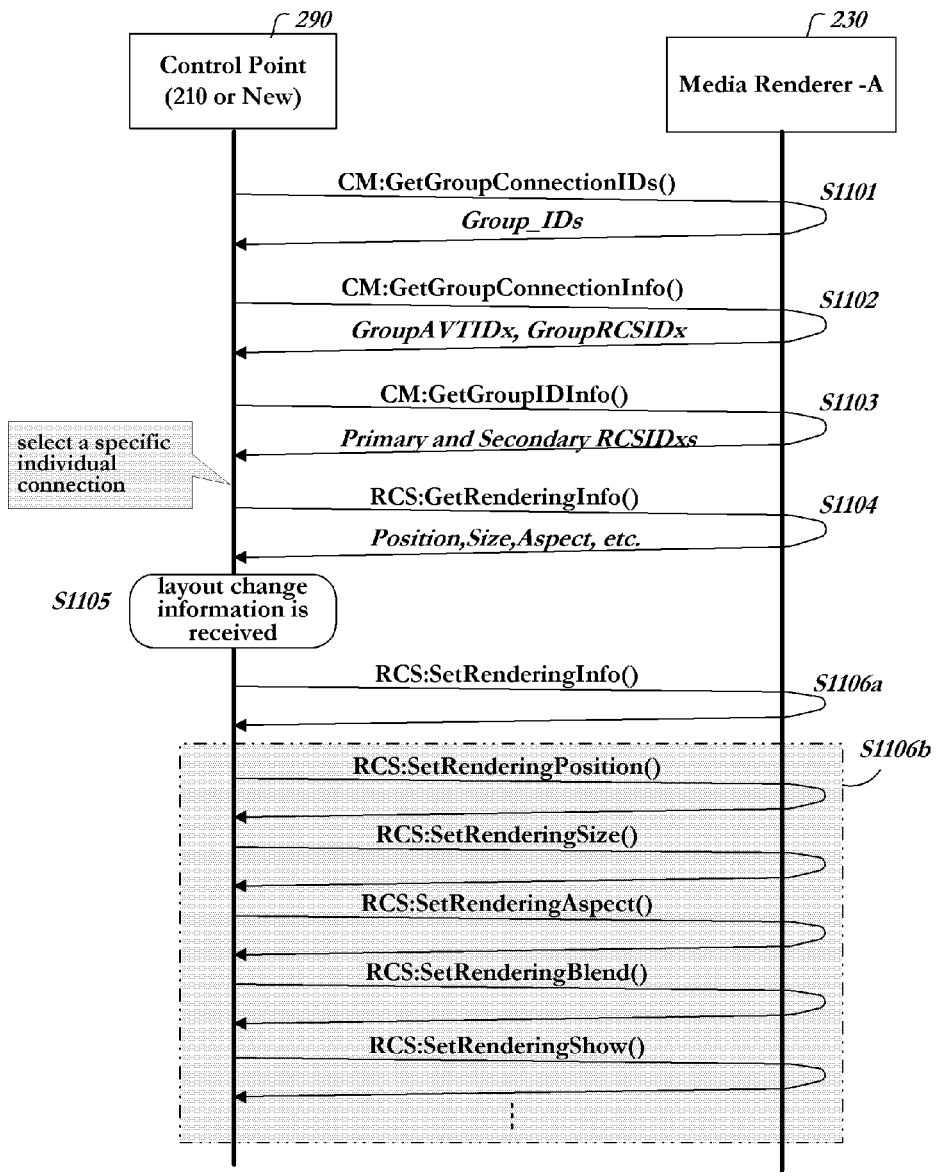
FIG. 20 illustrates a procedure of querying information on or controlling an arbitrary individual connection within a group connection according to one embodiment of the present invention.

FIG. 20 is one example of the above-mentioned operation, illustrating a procedure of changing display layout for a component corresponding to a particular individual connection belonging to a group connection during playback. As shown in the figure, CP 290 of FIG. 20 invokes an action "GetGroupConnectionIDs( )" for inquiring about a device specified by a user—about group connections currently set up for the media renderer A 230 in the example of FIG. 20—onto ConnectionManager (CM) service 232 within the media renderer A 230 where the action "GetGroupConnectionIDs( )" has the structure 903 illustrated in FIG. 16. Accordingly, instance IDs (GroupConnectionIDs) of ConnectionManager service 232 for currently established group connections are received (S1101).

The CP 290 selects one group connection from the received information. At this time, necessary conditions for selecting one group connection are determined from information entered by a user. Once a group connection is selected, an action for querying group connection information (GetGroupConnectionInfo( )) is invoked on the CM service 232 where the querying action has the structure 904 illustrated in FIG. 16 and carries an instance ID (GroupConnectionID) of CM service for the selected group connection in its input argument (S1102). The CM service 232, in response to the invocation of the querying action, delivers instance IDs of AVTransport service (AVT) and RenderingControl service (RCS) associated with instance ID of CM service for the group connection to the CP 290. In one embodiment according to the present invention, an instance ID of CM service for group connection may be also delivered to the CP 290 in response to the action for querying group connection information.

After receiving instance IDs of both services RCS and AVT for group connection, the CP 290 invokes an action "GetGroupIDInfo( )" for querying IDs of individual connections to the CM service 232 (S1103). Because an operation requested by a user is to change display layout, the invoked action for querying IDs of individual connections having such a structure 906 as illustrated in FIG. 16 carries an input argument including an instance ID of RCS for group connection among the received instance IDs of both the services. In response to the invocation of the ID querying action, the CM service 232 sends the CP 290 instance IDs (e.g., 'instance_RCSIDs' 1002 of FIG. 18) for entire individual connections pertaining to the instance ID of the corresponding service (i.e., RCS) for group connection that is specified by the input argument of the ID querying action after reading those instance IDs for entire individual connections from management information for managing group connection at present. If the management information includes additional information (e.g., information about whether a component corresponding to each individual connection is primary or secondary), that additional information is also provided for the CP 290. In another embodiment, an output argument of the action "GetGroupIDInfo( )" carries an instance ID for a primary component at the head among the instance IDs of the corresponding service for entire individual connections, whereby the CP 290 can distinguish an instance ID for a primary component from that of other components.

The CP 290 selects one individual connection from the received information. Conditions needed for selecting one individual connection are determined based on information entered by a user and/or the received information. In another embodiment according to the present invention, the CP 290 also invokes an action "GetGroupIDInfo( )" for querying instance IDs of individual connections using an instance ID of CM service for group connection when invoking S1103 the aforementioned action for querying individual connection IDs. If all of instance IDs of CM service for individual connections are received in response to the invoked action, the CP 290 invokes an additional actions "GetCurrentConnectionInfo( )" for the received instance IDs to obtain, for example, protocol information etc. Thusly-obtained information etc. is also provided to help a user to select one individual connection.

If one individual connection is chosen by a user, an action "GetRenderingInfo( )" for querying rendering information, having an instance ID of RCS for the chosen individual connection as an input argument, is invoked to the RCS 231. The rendering information for a media source corresponding to the chosen individual connection is received (S1104) in response to the action invocation. The rendering information includes all information (size, position, and aspect ratio of a display window, brightness, contrast, volume, and so on) stored in state variables set for rendering of the media source.

The CP 290 having received the rendering information provides a user with information related to display setting in proper manner and also receives information on changes of the display setting through appropriate UI (S1105). Receiving the information on changes, the CP 290 determines, based on the received information, what action is proper to user's request and invokes the determined action. For example, the CP 290 invokes a single rendering information setting action whose input argument includes all of changing information entered by a user (S1106a) or invokes several actions needed for reflecting the entered changing information. The several actions, each carrying properly-divided part of the entered changing information, are invoked sequentially (S1106b). The actions S1106b for changing information of display setting illustrated in FIG. 20 are just examples for the convenience of explanation, thus, only some of them may be invoked and actual invoking sequence need not observe the illustrated sequence either.

In one embodiment of the present invention that does not use a group connection, the invocations S1101 to S1103 of actions related to a group connection are not conducted. Instead, the moment a user selects one individual connection for which display setting is to be changed, the following procedures S1104,S1105, and S1106a or S1106b are conducted sequentially.

A state in which a group connection has been created is released by a command from the CP 210 or 290 when a proper request is entered from a user or it is determined that multi-source streaming is not necessary any more. For such release, the CP 210 or 290 invokes an action "RemoveFromGroup( )", having a structure 905 illustrated in FIG. 16, for withdrawing from a group to the CM 222 and 232 in order to withdraw each individual connection from a group connection. The action for withdrawing from a group, as shown in FIG. 16, has an input argument including both an instance ID for group connection and an instance ID for individual connection to withdraw from the group connection.

Receiving the action for withdrawing from a group, the CM 222 or 232 deletes, from the ID mapping information prepared as FIG. 18, an instance ID that is identical to an instance ID for an individual connection carried by an input argument of the received action and is also linked to an instance ID for a group connection carried by the input argument of the received action. Every time the CM 222 or 232 deletes an instance ID for an individual connection from the ID mapping information in response to the action "RemoveFromGroup( )" for withdrawing from a group, it examines the mapping information of an instance ID for a corresponding group connection and removes the instance ID for that corresponding group connection if an instance ID for individual connection associated therewith does not remain any more. The removed instance ID for group connection can be reused for an instance ID of another group connection.

Figure 21:
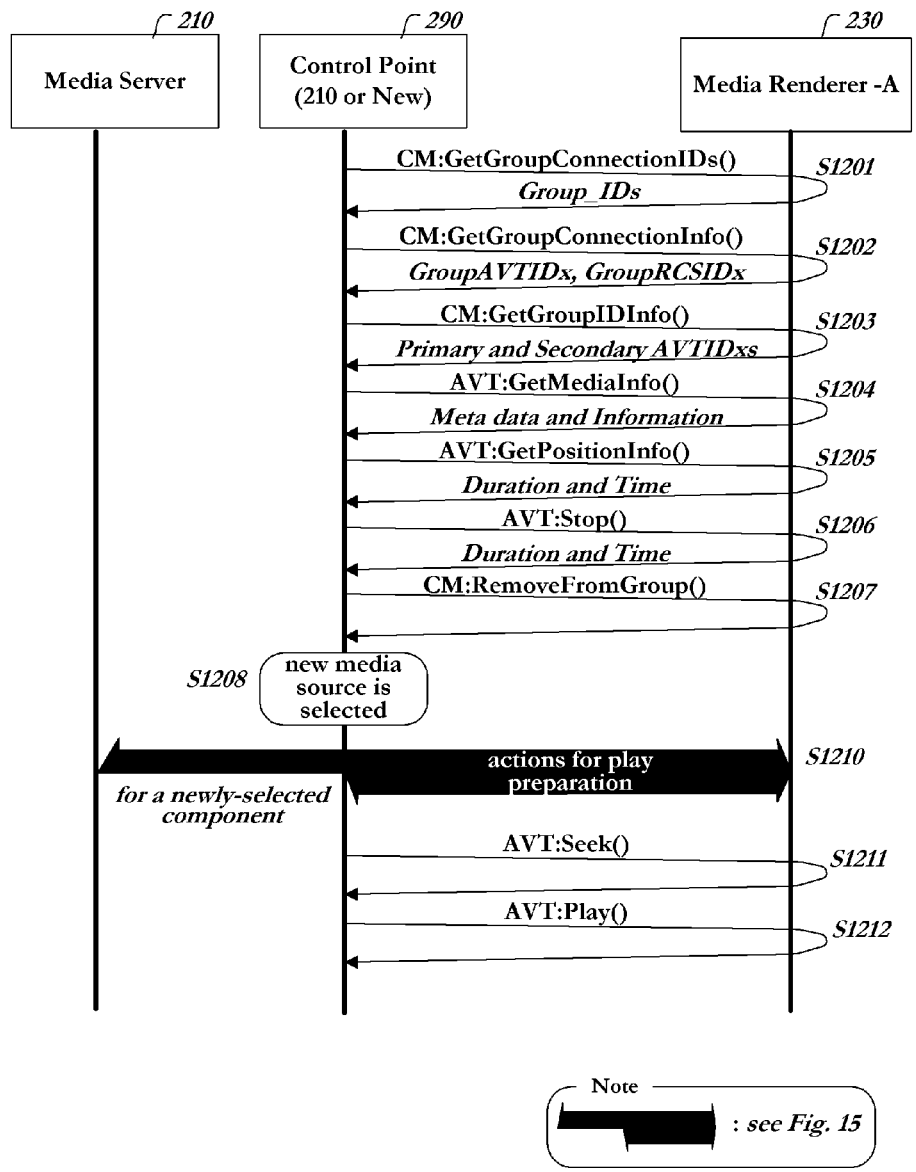
FIG. 21 illustrates a signal flow between devices and/or services conducted in the case of changing a component being played according to one embodiment of the present invention.

An instance ID of group connection can be used in a case of changing a component being played as well as changing information of display setting. FIG. 21 illustrates a signal flow conducted between devices and/or a services in a case of changing a component being played.

If a user requests to change a media source pertaining to current multi-source streaming, actions for obtaining an identifier for a single individual connection from a group connection are sequentially invoked (S1201,S1202) the same as in FIG. 20. The CP 290 receives an instance ID of both services RCS and AVT for a group connection in response to the sequential invocations and then invokes an action "GetGroupIDInfo( )" for querying an individual connection ID having the structure 906 illustrated in FIG. 16 to the CM service 232 (S1203). Because an operation requested from a user is on changing of a media source, an input argument of the invoked action for querying an individual connection ID carries an instance ID of AVTransport service for a group connection among the received instance IDs of both services. According to the invocation of the ID querying action, the CM service 232 reads, from management information for managing a current group connection, instance IDs (instance_AVTIDs) for all of individual connections pertaining to the instance ID of a corresponding service (i.e., AVT) for a group connection that is specified by the input argument of the invoked action.

Afterwards, the CM service 232 provides the CP 290 with the read instance IDs in response to the ID querying action.

The CP 290 selects one individual connection from the received information. Conditions needed for selecting one individual connection are determined based on information, entered by a user, on a media source to be replaced and the received information (or received information obtained through additional actions). After one individual connection is selected, the CP 290 invokes an action for querying media information to the AVTransport service 233 using an instance ID (instance_AVTID) of AVT for the selected individual connection (S1204). Metadata and various state information about a corresponding media source being played at present are obtained in response to the action for querying media information. The CP 290 requests the AVTransport service 233 to provide information on current playing position by invoking another action "GetPositionInfo( )" based on the obtained metadata and various state information (S1205). The information on current playing position provided by the AVTransport service 233 includes total playback time and a particular point of time on the total playback time.

If the information on current playing position of a media source to be replaced is received, the CP 290 stores it first and then invokes both actions sequentially (S1206,S1207) where one action is to stop play of the media source to be replaced and another is to withdraw, from an instance ID for a group connection, an instance ID assigned to a connection corresponding to the media source to be replaced. Afterwards, if a new media source is chosen by a user from a selection window of media sources provided based on item information by the CP 290 (S1208), preparing operations for an individual connection of the new media source are conducted (S1210). Invocation 584-n_6 of the layout-related actions illustrated in FIG. 15 is not included in those preparing operations because display environment for the media source whose connection is released for streaming replacement is reused for the new media source. In another embodiment according to the present invention, a new display layout may be set for a replacing media source. It is a matter of course that necessary actions for constructing the new display layout are invoked in this case.

After the preparing operations are finished, the CP 290 invokes a search action "Seek( )" specifying a play position for the connection corresponding to the new media source that is selected for replacement (S1211) and then invokes a play action (S1212). According to the invocations of both actions, data of the new media source starts to be streamed from the specified play position between the media server 220 and the media renderer A 230. The data being streamed is presented through the previously-set display environment along with or in synchronization with data of other media sources being played at present under control of the RenderingControl service 231. Through the above-explained processes, a media source (e.g., English subtitle) being played in multi-source streaming is replaced with a new media source (e.g., Korean subtitle).

The foregoing description of preferred embodiments of the present invention has been presented for purposes of illustration. Thus, those skilled in the art may utilize the invention and various embodiments with improvements, modifications, substitutions, or additions within the spirit and scope of the invention as defined by the following appended claims.

The invention claimed is:

1. A method for controlling a multiple component including a video content and an audio content, the method comprising:

issuing a browse action to a media server for obtaining additional information, the additional information indicating a metadata associated with the multiple component;

receiving a browse response in response to the browse action, wherein the browse response includes the additional information including a video component, an audio component and a caption component, wherein each of the video component, the audio component and the caption component is grouped based on a component type, and wherein each of the grouped video component, the grouped audio component and the grouped caption component is included in a separate resource structure element;

issuing a play action to a media renderer for requesting a playback of the video content and the audio content;

playing the video content and the audio content according to the play action, wherein the video content and the audio content are synchronously played based on the additional information; and issuing a transform action to the media renderer for changing the audio content to other audio content during the playing of the video content and the audio content, wherein the audio content and the other audio content are included in the grouped audio component, and wherein the grouped audio component further includes access location information and expression language information.

2. The method of claim 1, wherein each of the grouped video component, the grouped audio component and the grouped caption component comprises information on whether a grouped component is essential for playing the video content.

3. The method of claim 1, wherein the grouped video component and the grouped audio component comprise coding type information.

4. An apparatus for controlling a multiple component including a video content and an audio content, the apparatus comprising:

a processor configured to:

issue a browse action to a media server for obtaining additional information, the additional information indicating a metadata associated with the multiple component, receive a browse response in response to the browse action, wherein the browse response includes the additional information including a video component, an audio component and a caption component, wherein each of the video component, the audio component and the caption component is grouped based on a component type, and wherein each of the grouped video component, the grouped audio component and the grouped caption component is included in a separate resource structure element, issue a play action to a media renderer for requesting a playback of the video content and the audio content, play the video content and the audio content according to the play action, wherein the video content and the audio content are synchronously played based on the additional information, and issue a transform action to the media renderer for changing the audio content to other audio content during the playing of the video content and the audio content, wherein the audio content and the other audio content are included in the grouped audio component, and wherein the grouped audio component further includes access location information and expression language information.

5. The apparatus of claim 4, wherein each of the grouped video component, the grouped audio component and the grouped caption component comprises information on whether a grouped component is essential for playing the video content.

6. The apparatus of claim 4, wherein the grouped video component and the grouped audio component comprise coding type information.

* * * * *